United States Patent [19]

Omaru et al.

[11] Patent Number: 5,294,498

[45] Date of Patent: Mar. 15, 1994

[54] ANODE MATERIAL, METHOD FOR PRODUCING IT AND NON-AQUEOUS ELECTROLYTE CELL EMPLOYING SUCH ANODE MATERIALS

[75] Inventors: Atsuo Omaru; Hideo Azuma; Yoshio Nishi, all of Kanagawa, Japan

[73] Assignee: Sony Corporation, Tokyo, Japan

[21] Appl. No.: 940,949

[22] PCT Filed: Feb. 28, 1992

[86] PCT No.: PCT/JP92/00238

§ 371 Date: Nov. 2, 1992

§ 102(e) Date: Nov. 2, 1992

[87] PCT Pub. No.: WO92/16026

PCT Pub. Date: Sep. 17, 1992

[30] Foreign Application Priority Data

Mar. 2, 1991 [JP] Japan .................................. 3-077447

[51] Int. Cl.$^5$ .................................................. H01M 6/14
[52] U.S. Cl. ..................................... 429/122; 429/194; 429/218; 252/502; 432/13
[58] Field of Search ................ 429/218, 40, 122, 194; 252/502; 204/291, 242; 501/99, 87; 432/13

[56] References Cited

U.S. PATENT DOCUMENTS 5,093,216  3/1992  Azuma et al. .................. 252/502

FOREIGN PATENT DOCUMENTS

| | | |
|---|---|---|
| 0418514 | 7/1990 | European Pat. Off. . |
| 52-35205 | 3/1977 | Japan . |
| 55-47217 | 4/1980 | Japan . |
| 58-35881 | 3/1983 | Japan . |
| 59-228372 | 12/1984 | Japan . |
| 60-36316 | 2/1985 | Japan . |
| 60-182670 | 9/1985 | Japan . |
| 62-122066 | 6/1987 | Japan . |
| 62-283806 | 12/1987 | Japan . |
| 63-164177 | 4/1988 | Japan . |

*Primary Examiner*—Kathryn Gorgos
*Attorney, Agent, or Firm*—Hill, Steadman & Simpson

[57] ABSTRACT

An anode material composed mainly of a difficultly graphatizable carbon or coke (easily graphatizable coke) consisting essentially of carbon, phosphorus and oxygen, and containing phosphorus in an amount of 0.2 to 9.0 wt %, is disclosed. The anode material exhibits a peak in a $^{31}$P solid NMR spectrum in a range of ±100 ppm based on orthophosphoric acid, and a peak in a 2p orbital spectrum of a phosphorus atom in XPS of not more than 135 eV. The anode material is prepared by adding phosphoric acid or phosphorus oxides to an organic material or a carbonic material. A non-aqueous liquid electrolyte cell is produced from the above anode material, an Li-containing cathode and a liquid electrolyte.

4 Claims, 22 Drawing Sheets

ANODE MATERIAL, METHOD FOR PRODUCING IT AND NON-AQUEOUS ELECTROLYTE CELL EMPLOYING SUCH ANODE MATERIALS

TECHNICAL FIELD

This invention relates to an anode material mainly consisting of carbon, phosphorus and oxygen, and to which lithium is doped and undoped, and a method for producing such material. More particularly, it relates to a non-aqueous electrolyte cell having such material as an anode.

BACKGROUND ART

The electrical capacity of a carbonaceous material per unit weight is governed by lithium dosage, and hence it is desirable that lithium dosage of the carbonaceous material be as large as possible in order to increase the charging/discharging capacity of the cell. (Theoretically, one Li atom per six carbon atoms represents an upper limit.)

Up to now, a carbonaceous material obtained by carbonizing an organic material, as described in JP Patent KOKAI Publication No. 62-122066 (1986) or JP Patent KOKAI Publication No. 62-90863 (1987), has been known as the carbonaceous material employed for the anode for this type of the cell.

However, with the above described carbonaceous material, lithium dosage is insufficient and is of the order of about one half of the theoretical value.

The present invention has been proposed for further improving the carbonaceous material. It is an object of the present invention to provide an anode material having lithium dosage far exceeding that of the conventional carbonaceous material, and a method for producing such anode material.

It is another object of the present invention to provide a non-aqueous electrolyte dell having a large discharge capacity and superior in cycle life.

DISCLOSURE OF THE INVENTION

As a result of our eager searches towards achieving the above objects, the present inventors have found that specific compounds containing carbon, phosphorus and oxygen exhibit desirable characteristics as an anode material. Our structural analyses by $^{31}P$ solid (Nuclear Magnetic Resonance) and XPS (X-ray photoelectron spectroscopy) have revealed that the added phosphorus atoms do not exist as atoms alone or as compounds, such as oxides, alone, but are reacted with oxygen in the course of sintering to generate a compound having carbon-phosphorus or carbon-oxygen-phosphorus bonds. This means that the effect of addition of the phosphorus compounds, producing an increase in lithium dosage, is not displayed simply as lithium doping and undoping with respect to the carbonaceous material, but is displayed by using a special compound mainly consisting of carbon, oxygen and phosphorus, referred to hereinafter as a C—P—O compound.

The anode material of the present invention has been completed on the basis of the above information. It is mainly composed of a compound consisting essentially of carbon, phosphorus and oxygen with a phosphorus content in an amount of 0.2 to 9.0 wt % and exhibits a peak in a $^{31}P$ solid NMR spectrum in a range of ±100 ppm based on orthophosphoric acid, while exhibiting a peak in a 2p orbital spectrum of a phosphorus atom of not more than 135 eV in X-ray photoelectron spectroscopy for a carbon-carbon linkage energy in the 1s orbital spectrum of a carbon atom of 284.6 eV.

The method for producing an anode material according to the present invention comprises adding a phosphorus compound to an organic material or a carbonic material in an amount of 0.2 to 32 wt % in terms of phosphorus and sintering the resulting mixture in an inert atmosphere.

A non-aqueous liquid electrolyte cell of the present invention is composed of an anode mainly composed of a compound consisting essentially of carbon, phosphorus and oxygen with a phosphorus content in an amount of 0.2 to 9.0 wt % and exhibits a peak in a $^{31}P$ solid NMR spectrum in a range of ±100 ppm based on orthophosphoric acid, while exhibiting a peak in a 2p orbital spectrum of a phosphorus atom of not more than 135 eV in X-ray photoelectron spectroscopy for a carbon-carbon linkage energy in the 1s orbital spectrum of a carbon atom of 284.6 eV, an Li-containing cathode and a non-aqueous liquid electrolyte.

By adding a phosphorus compound to the organic material or carbonic material and sintering the resulting mixture in an inert atmosphere, a compound consisting essentially of C, P and O and having a P—C linkage or a C—O—P linkage is prepared. The compound exhibiting a peak in a $^{31}P$ solid NMR spectrum in a range of ±100 ppm based on orthophosphoric acid and a peak in a 2p orbital spectrum of a phosphorus atom of not more than 135 eV in X-ray photoelectron spectroscopy for a carbon-carbon linkage energy in the 1s orbital spectrum of a carbon atom of 284.6 eV has lithium dosage larger than that in a conventional carbonaceous material. By using the material as an anode material, a non-aqueous liquid electrolyte cell having a large charging/discharging capacity may be prepared.

By providing a compound containing a phosphorus compound and thus consisting essentially of C, P and c and having a C—P or C—O—P linkage, an anode material may be provided which has a larger lithium doping quantity (lithium dosage).

That is, the anode material of the present invention is a special compound which, while having an internal composition of $(C_6H_5O)_2P(=OH)$, has a superficial structure of $(C_6H_5O)_2P(=O)(OH)$ and reduced $(C_6H_5O)_2P(=O)(OH)$, $(C_6H_5O)_3P(=O)$ and $(C_6H_5O)_3P$. It is this special structure that displays the specific effect of increasing the lithium doping quantity.

According to the present invention, the anode material having superior characteristics may be produced by a simplified operation, and the anode material suitable for a lithium secondary cell may be produced without increasing manufacture costs or lowering the productive efficiency.

Besides, with the non-aqueous liquid electrolyte cell of the present invention, making use of the anode material having the larger lithium doping quantity, a charging/discharging capacity even in excess of a theoretical value possible with the use of the graphite anode may be realized, while the cell exhibits superior cyclic characteristics. The present material renders it possible to produce a non-aqueous liquid electrolyte cell having a larger charging/discharging capacity.

BEST MODE FOR CARRYING OUT THE INVENTION

Figure 1:
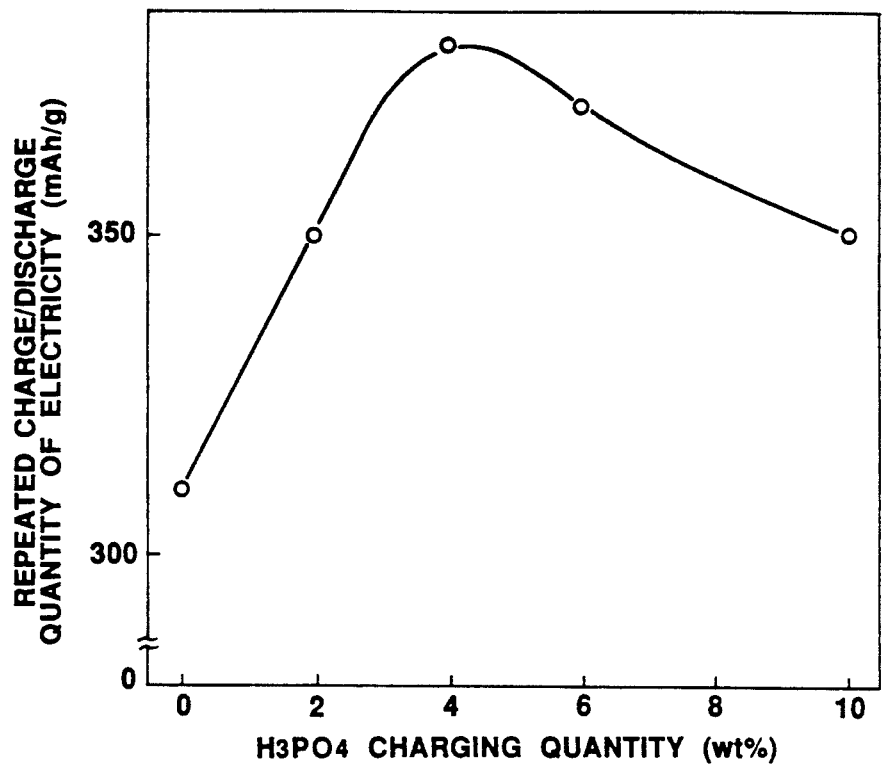
FIG. 1 is a graph showing the relation between the charging quantity of phosphoric acid and the continuous charging-discharging electrical quantity in a produced polyfurfuryl alcohol sintered body.
Figure 2:
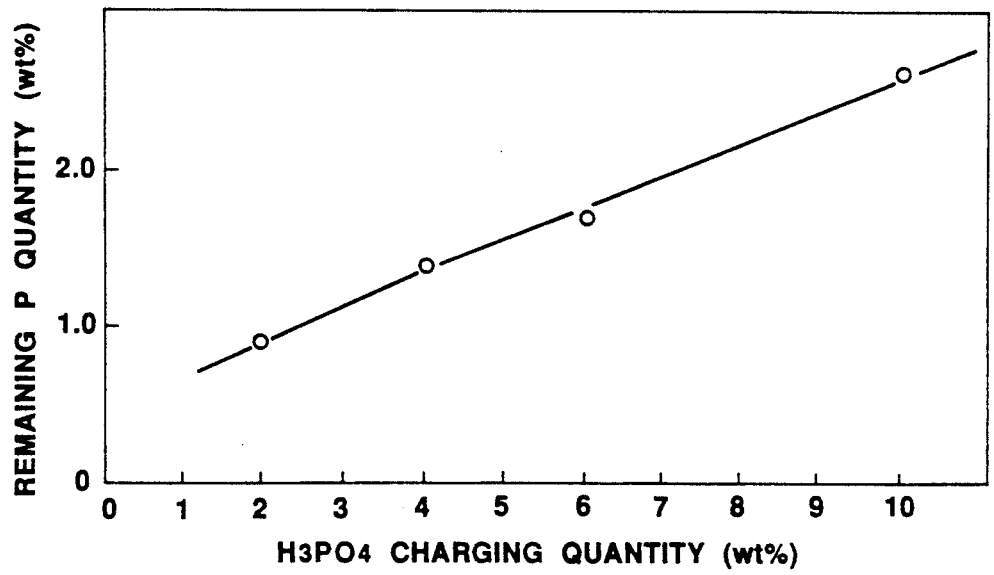
FIG. 2 is a graph showing the relation between the charging quantity of phosphoric acid in the polyfurfuryl alcohol resin sintered body and the phosphorus survival rate.

The anode material of the present invention is obtained by adding a phosphorus compound to an organic material or a carbonic material and sintering the resulting mass in an inert atmosphere.

Although there is no limitation to the organic material or the carbonic material, employed as a starting material, such organic material or carbonic material which exhibits the spacing of (002) planes of not less than 3.70 Å and true density of lower than 1.70 g/cm³ on sintering without exhibiting an heat emission peak at 70° C. or higher on differential thermal analyses in an air current and which turns out to be so-called difficultly graphatizable carbon, is most preferred.

The above-mentioned difficultly graphatizable carbon has a larger lithium dosage than that of the conventional carbonic material and, in conjunction with the effect derived by addition of phosphorus compounds, renders it possible to provide an anode material having a lithium dosage far exceeding that achieved with the conventional carbonaceous material.

The organic material which is to be the starting material for the above-mentioned difficultly graphatizable carbon may preferably be a furan resin consisting in a homopolymer or a copolymer of furfuryl alcohol or furfural. It is because the carbonaceous material obtained by carbonizing the furan resin has a (002) plane distance of 3.70 Å or more and a true density of 1.70 g/cc or less without exhibiting a heat emission peak due t oxidation at 700° C. or higher on DTA and hence exhibits properties most desirable as an anode material for cells.

As another starting material for the difficultly graphatizable carbon, a petroleum pitch having a particular H/C atomic ratio and into which an oxygen-containing functional group is introduced (by way of a so-called oxygen cross-linking) may also be employed because it exhibits superior characteristics when carbonized, in the same manner as the above-mentioned furan resin.

The above-mentioned petroleum pitch may be coal tar, ethylene bottom oil, tars or asphalt obtained on high temperature thermal cracking of crude oil, and is produced by thermal polycondensation, extraction, or chemical polycondensation.

The H/C atomic ratio of the petroleum pitch is critical and, in order for the petroleum pitch to be turned into the difficultly graphatizable carbon, the H/C atomic ratio needs to be in a range of 0.6 to 0.8.

Although there is no particular limitation to means for introducing an oxygen-containing functional group into the petroleum pitch, a wet method by an aqueous solution of nitric acid, mixed acid, sulfuric acid or hypochlorous acid, a dry method by an oxidizing gas (air or oxygen) or a reaction by a solid reagent, such as sulfur, ammonium nitrate, ammonium persulfate or ferric chloride, may be employed.

For example, if oxygen is introduced by the above technique into the petroleum pitch, an ultimate carbonaceous material may be produced in a solid-phase state without being melted in the course of carbonization (at 400° C. or higher). The process is similar to the process of yielding the difficultly graphatizable carbon.

The petroleum pitch in to which the oxygen-containing functional group has been introduced by the above-mentioned technique is carbonized so as to be used as an anode material. There is no particular limitation to the carbonizing conditions and the anode material having a larger lithium dosage per unit weight may be obtained by setting the carbonizing conditions so that the (002) plane distance is 3.70 Å or more, the true density is 1.70 g/cc or less and the heat emission peak by oxidation on DTA is not exhibited at 700° C. or higher. For example, the (002) plane distance of 3.70 Å or higher may be achieved by setting the oxygen content of a precursor obtained on oxygen cross-linking of the petroleum pitch so as to be 10 wt % or higher. Thus the oxygen content of the precursor is preferably 10 wt % or higher and in a range of 10 to 20 wt % for practical purposes.

The organic material subjected to oxygen crosslinking needs only to have a H/C atomic ratio of 0.6 to 0.8 and hence may be used subject to a preceding heat treatment for producing the state of the pitch. The starting materials include condensation polycyclic hydrocarbon compounds, such as phenolic resins, acrylic resins, halogenated vinyl resins, polyimide resins, polyamideimide resins, polyamide resins, covalent resins, celltrene, anthracene, triphenylene, pyrene, perylene, pentaphene or pentacene, derivatives thereof, such as carboxylic acids, carboxylic anhydrides or carboxylic acid imides thereof, various pitches consisting essentially of mixtures of the above-mentioned compounds, and condensation heterocyclic compounds, such as acenaphthylene, indole, isoindole, quinoline, isoquinoline, quinoxaline, phthalazine, carbazole, acrydine, phenazine and phenanthridine.

Alternatively, an organic material or a carbonic material which is turned into coke on heat treatment at 700° C. or lower followed by sintering may be employed as a starting material.

By the "coke" is meant a carbonic material which is graphatized on heat treatment at about 3000° C., that is, easily graphatizable carbon. This material is more favorable than the above-mentioned difficultly graphatizable carbon with respect to packing density.

That is, in a common tubular cell produced by spirally winding an electrode, it is necessary to increase the electrode area for high efficiency charging and discharging, while more active material needs to be packed into the electrode. However, the carbonic material has a low true density as compared to the active material of the oxide type material. Therefore, if it is possible with a carbonic material with a higher true density, such as coke (having the true density of the order of 2.0 g/cm$^3$) to increase the capacity by the effect of P addition, a higher capacity may be expected to be achieved than if the difficultly graphatizable carbon added with P is employed.

Typical of the organic materials employed as a starting material for the above-mentioned easily graphatizable carbon is coal or pitch. The pitch may include coal tar, ethylene bottom, tars or asphalt obtained on high temperature cracking of crude oil, pitch obtained on distillation, such as vacuum distillation, atmospheric distillation or steam distillation of asphalt, or the pitch obtained by thermal polycondensation, extraction or chemical polycondensation or the pitch produced on carbonization of wood. Among the starting materials for polymeric compounds, there are a polyvinyl chloride resin, polyvinyl acetate, polyvinyl butyrate and 3,5-dimethylphenolic resins.

These starting materials exist in a liquid state at the temperature of up to 400° C. during carbonization. By maintaining the materials at this temperature, aromatic rings undergo condensation and become polycyclic to produce a stacked orientation. Then, at a temperature on the order of 500° C. or higher, a solid carbon precursor, that is a semi-coke, is produced. The process is termed a liquid-phase carbonization which is a typical process of producing the easily graphatizable carbon.

The above-mentioned starting materials, such as coal, pitch od polymeric compounds, naturally undergo the above-mentioned liquid-phase carbonization when carbonized.

Condensation polycyclic hydrocarbon compounds, such as naphthalene, phenanthrene, anthracene, triphenylene, pyrene, perylene, pentaphene or pentacene, derivatives thereof, such as carboxylic acids, carboxylic anhydrides or carboxylic acid imides, mixtures of the above compounds, and condensation polycyclic compounds, such as acenaphthylene, indole, isoindole, quinoline, isoquinoline, quinoxaline, phthalazine, carbazole, acrydine, phenazine or phenanthridine, may also be employed as starting materials.

For producing the carbonaceous material using the above-mentioned starting organic material, the starting material is carbonized at 300° to 700° C. in a nitrogen atmosphere an the carbonized material is sintered in a nitrogen atmosphere under the conditions of the temperature rise rate of 1° to 20° C. per minute, the ultimate temperature of 900° to 1500° C. and the holding time at the ultimate temperature of 0 to 5 hours. Of course, the carbonization step may be omitted if so desired. According to the present invention, before sintering the stating organic material, or after carbonization of the starting organic material to some extent, a phosphorus compound(s) is added thereto and the resulting mass is sintered to produce a compound which is composed mainly of carbon, phosphorus and oxygen and which has an increased lithium doping quantity.

The phosphorus compounds may include oxides such as phosphorus pentaoxide, oxoacids such as orthophosphoric acid, and salts thereof. Phosphoric compounds and phosphoric acid are preferred in view of ease in handling. Above all, if a starting material is employed which is turned into coke (easily graphatizable carbon) after sintering, oxides of phosphorus, such as phosphorus pentaoxide, are preferred.

In producing the anode material according to the present invention, phosphorus compounds are added to a starting material for a C—P—O material, that is the organic material or the carbonic material, in a quantity of 0.2 to 32 wt %, preferably n a quantity of 1.0 to 15 wt % in terms of phosphorus, whereas the ratio of phosphorus remaining in the produced C—P—O compound is 0.2 to 9.0 wt %, preferably 0.3 to 5.0 wt %. Above all, when the difficultly graphatizable carbon is to be produced after sintering, the phosphorus compounds are added in a quantity of 0.2 to 15 wt % and preferably 0.5 to 5.0 wt % in terms of phosphorus to the C—P—O compound, and the ratio of phosphorus remaining in the produced C—P—O compound is preferably 0.2 to 5.0 wt %.

If the quantity of addition of the phosphorus compound(s) is less than the above-mentioned range, such that the ratio of phosphorus in the C—P—O compound is low, the effect of increasing the lithium dosage can be expected only to a limited extent. Conversely, if the quantity of the phosphorus compound(s) is excessive, element phosphorus tends to be increased in quantity to decrease the ratio of the C—P—O compound effectively taking part in lithium doping to lower the characteristics of the anode material.

As a principle, the phosphorus compound(s) may be added to a material which has already been turned into the carbonaceous material, in which case the C—P—O material may be produced, however, the quantity of residual phosphorus is diminished, as a result of which the lithium doping quantity is not increased significantly. Therefore, it is more preferred to add the phosphorus compound(s) to the initial starting material.

If the starting material is to be turned into coke (easily graphatizable carbon) after sintering, the upper limit temperature of addition of the phosphorus compound is 700° C. If the phosphorus compound is added at a higher temperature, phosphorus may be taken up to some extent, however, the effect on lithium doping and undoping is nil. This indicates that the site of C—P—O linkage in the bulk material which would be produced by the reaction between the starting material and the phosphorus compound is likely to participate in lithium doping and undoping.

The C—P—O compound obtained after sintering is pulverized and classified so as to be used as an anode material. The pulverization process may be carried out before or after sintering or during the temperature raising process.

If the above-mentioned C—P—O compound is to be used as an anode of the non-aqueous electrolyte cell, the cathode preferably has increased content of Li. Thus, the cathode material is preferably a composite metal oxide having the general formula $LiMO_2$, M being at least one of Co and Ni, or an Li-containing inter-layer compound. The most preferred cathode material is $LiCoO_2$.

The non-aqueous electrolyte cell is intended for achieving a high capacity. It is necessary for the cathode to contain an amount of Li corresponding to a charging and discharging capacity of 250 mAH or higher per gram of the C—P—O compound of the anode in a steady state (that is after five times of the charging and discharging operations). Thus it is preferred for the cathode material to contain an amount of Li corresponding to the charging and discharging capacity of 250 mAH per gram of the C—P—O compound for the anode, while it is more preferred for the cathode material to contain an amount of Li corresponding to the charging and discharging capacity of 300 mAH per gram of the C—P—O compound for the anode. It is not absolutely necessary for Li to be supplied in its entirety from the cathode material, since it suffices that an amount of Li corresponding to the charging and discharging capacity of 250 mAH per gram of the C—P—O compound be present in the cell system. The amount of Li is determined by measuring the discharging capacity of the cell.

The non-aqueous electrolyte solution may be adjusted by suitably combining the organic solvent and the electrolyte. Any of the organic solvents and the electrolytes which may be employed in this type of the cell may be employed.

Examples of the organic solvents include propylene carbonate, ethylene carbonate, diethyl carbonate, dimethyl carbonate, methyl ethyl carbonate, 1,2-dimethoxyethane, 1,2-diethoxyethane, γ-butyrolactone, tetrahydrofuran, 2-methyltetrahydrofuran, 1,3-dioxolane, 4 methyl, 3 dioxofuran, diethylether, sulforane, methylsulforane, acetonitrile, propionitrile, anisole, acetate, butyrate or propionate.

Examples of the electrolytes include $LiClO_4$, $LiAsF_6$, $LiPF_6$, $LiBF_4$, $LiB(C_6H_5)_4$, $CH_3SO_3Li$, $CF_3SO_3Li$, $LiCl$ and $LiBr$.

The present invention is hereinafter explained by referring to Examples. It should however be noted that the present invention is not limited to these merely illustrative Examples.

First, the methods for measuring the capacity of the anode, $^{31}P$ solid NMR spectrum and the X-ray photoelectron spectroscopic spectrum, are explained.

Method for Measuring the Capacity

The C—P—O material obtained after sintering is pulverized in a mortar and screened to a particle size of not more than 38 μm. Evaluation was made by a test cell.

In preparing the test cell, the sorted powders prior to preparation into an anode mix were subjected to a preceding heat treatment in an Ar atmosphere under conditions of the temperature raising rate of about 30° C. per minute, an ultimate temperature of 600° C. and the holding time at the ultimate temperature of one hour. The anode mix was prepared by adding 10 wt % of polyvinylidene fluoride as a binder and adding dimethylformamide as a solvent, followed by drying. An amount of 37 g of the mix were molded into a pellet of 15.5 mm in diameter, along with an Ni mesh as a current collector, to produce an operating electrode. The test cell was constructed in the following manner.

| Cell Construction | |
| --- | --- |
| coin-type cell | (20 mm in diameter, 2.5 mm in thickness) |
| counter-electrode | Li metal |
| separator | polypropylene porous film |
| electrolyte solution | a mixed solvent of propylene carbonate and 1,2-dimethoxyethane (volume ratio of 1:1) to which $LiClO_4$ is dissolved at a ratio of 1 mol/l |
| current collector | copper foil |

The capacity of the above-described test cell per 1 g of the C—P—O compound was measured. Meanwhile, lithium doping of the operating electrode (charging) was carried out in such a manner that the sequence of operations of charging for one hour followed by a pause of two hours was repeated at the current density of 0.53 $mA/cm_3$ until the equilibrium potential of 3 mV ($Li/Li^+$) at a standstill was reached. It is noted that, strictly speaking, the doping process of the C—P—O compound in this testing method is not charging but discharging, however, the present doping process is termed charging and the undoping process is termed discharging, in order to take account of the actual state of the cells. The discharging process (undoping process) was carried out by repeating the sequence of operations of discharging for one hour at a current density of 0.53 mA/cm$_2$ followed by a pause of two hours, with the terminal voltage of 1.5 V as a cutoff voltage.

It has been found that the discharged quantity of electricity is less in any material than the charged quantity of electricity. The non-discharged quantity of electricity is termed a capacity loss for convenience sake. In actual cells, the value of the capacity losses is important in evaluating the anode material.

Method for Measuring $^{31}$P solid High resolution NMR

The powdered sample was mixed with KCl, each in an equal amount. The resulting mixture was charged in a sample tube which was then sealed tightly. Measurements were conducted under the following conditions.

| <Conditions for Measuring $^{31}$P solid High resolution NMR> | |
|---|---|
| apparatus | JEOL GSX 270 (solid probe : GSH 27T6) |
| Measurement Nucleus | $^{31}$P |
| Measurement Frequency | 109.25 MHz |
| Measurement Mode | MASGHD |
| Control Material | diammonium hydrogen phosphate (1.6 ppm) |
| R.P.M. of Sample Tube | about 5000 Hz |
| Measurement Temperature | room temperature |
| Diluent | KCl (two to threefold) |

XPS (X-ray Photoelectron Spectroscopy

Using a powdered sample, the spectrum of the P atom on the 2p orbital was measured under the following conditions.

| Measurement Conditions for XPS (X-ray photoelectron Spectroscopy> | |
|---|---|
| Apparatus | SSI M-PROBE |
| Degree of Vacuum During Measurement | After evacuation at $1 \times 10^{-9}$ torr, an argon gas was introduced and measurement was conducted at $2 \times 10^{-7}$ torr |
| Neutralizing Electron | 2.0 eV |
| Pass Energy | 50 eV |
| Photoelectron Taking Angle | 35° |
| Charging Homogenization | Ni mesh |
| Reference | Carbon - Carbon Linkage 284.6 eV |
| Curve Fitting | Gaussian 80% + Lorentzian 20% |

Control Compound

Since the presence of alkyl chains can hardly be presumed in a carbonic material heat-treated at elevated temperatures, it is more reasonable that the terminal end linked to phosphorus be a benzene ring. The chemical shift of NMR and the binding energy of XPS were compared with the measured values of the aromatic phosphorus compounds to identify the state of presence of phosphorus.

Meanwhile, it was confirmed that the above-mentioned aromatic phosphorus compounds could be used as reference compounds from the fact that increase in the number of benzene rings linked to the phosphorus compounds was not effective, as was confirmed by simulation by calculation of molecular orbital.

The chemical shift values in the $^{31}$P solid NMR spectrum of each of the phosphorus compounds and the binding energy in the XPS-P (2p) spectrum are shown in Table 1.

TABLE 1

| P compounds | chemical shift values(ppm) | binding energy(eV) |
|---|---|---|
| $(C_6H_5)_3P=O$ | 71.7 | 132.0 |
| $(C_6H_5)_2P(=O)(OH)$ | 28.9 | 132.8 |
| $(C_6H_5)P(=O)(OH)_2$ | 21.8 | — |
| $(C_6H_5)P(=O)(OH)H$ | 19.8 | — |
| $(C_6H_5)_3P$ | −8.2 | 130.5 |
| $(C_6H_5O)_2P(=O)(OH)$ | −12.7 | 134.3 |
| $(C_6H_5O)_3P=O$ | −16.8 | 133.8 |
| $H_3PO_4$ | 0 | 134.7 |
| P (element) | — | 129.6 |

EXPERIMENT 1

The present experiment is directed to inspection of the difficultly graphatizable carbon.

Preliminary Experiment

First, using a furan resin as an organic material, the effect by phosphorus addition was checked. FIG. 1 shows changes caused by the charging quantity of phosphoric acid in the continuous charging and discharging capacity in a cell the anode of which is a furfuryl alcohol resin (polymerization catalyst:maleic anhydride) which is added with phosphoric acid and sintered at 1200° C. It may be seen that addition of phosphoric acid is highly effective in sintering for enhancing the charging and discharging capacity. Phosphorus thus added to the resin was left in the produced C—P—O compound in an amount which depended on the amount of addition. Meanwhile, phosphorus quantitation was carried out by inductive coupling type plasma emission spectral analyses.

Figure 3:
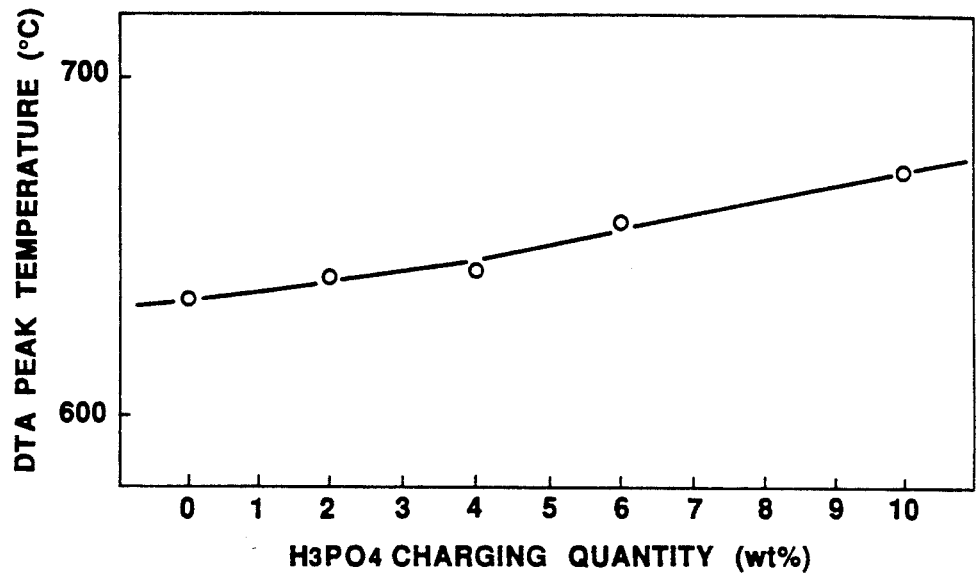
FIG. 3 is a graoh showing (Differential Thermal Analysis) peak temperature changes in the polyfurfuryl alcohol sintered body caused by the phosphoric acid charging quantity.
Figure 4:
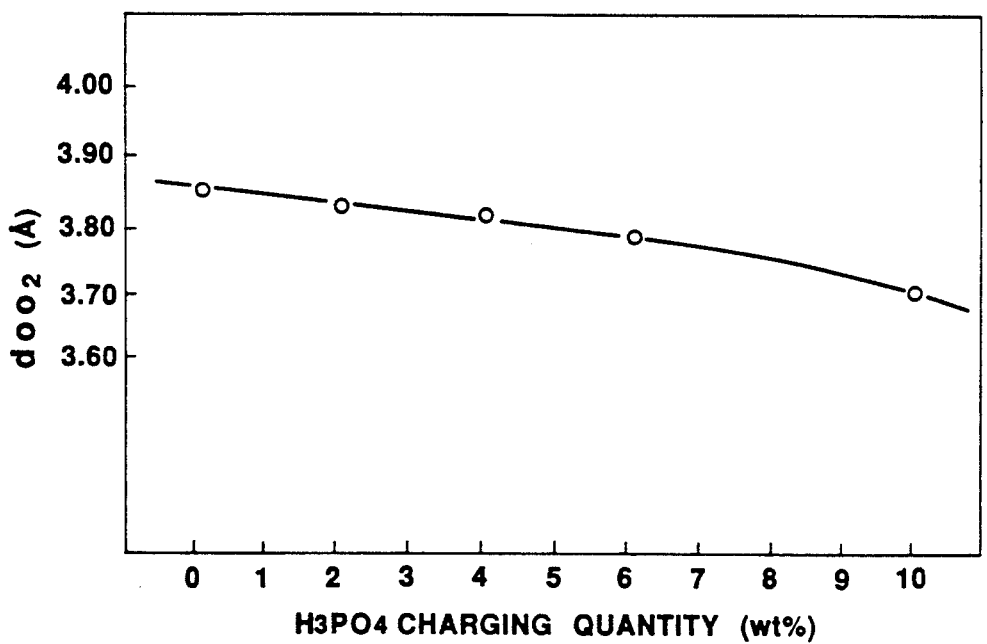
FIG. 4 is a graph showing changes in $d_{002}$ in the polyfurfuryl alcohol resin sintered body caused by the phosphoric acid charging quantity.

Meanwhile, PFA-C showed no heat emission peak at higher than 700° C., as revealed by DTA, while having a larger distance between adjacent (002) planes of 3.85 Å. These characteristics remained almost unchanged after phosphorus addition during sintering to PFA-C, as shown in FIGS. 3 and 4. For example, after adding 10 wt % of phosphoric acid, the emission peak as revealed by DTA was of the order of 680° C., while the distance between the adjacent (002) planes was 3.70 Å or more.

Preliminary Experiment 2

First, a petroleum pitch (H/C aromic ratio of 0.6 to 0.8) was oxidized to provide a carbonic precursor having an oxygen content of 15.4 wt %. Various phosphorus compounds, namely orthophosphoric acid, phosphoric anhydride (phosphorus pentaoxide) and various phosphates, were added to the carbonic precursor and the resulting mass was heat-treated in a nitrogen atmosphere at 500° C. for five hours.

The heat-treated precursor was pulverized in a mill and charged into a crucible where it was sintered in a nitrogen atmosphere under conditions of temperature raising rate of 5° C./minute, a maximum reached temperature of 1100° C. and a holding time at the maximum reached temperature of one hour.

After cooling, the sintered product was pulverized in a mortar and screened to a particle size of not more than 38 μm. The sorted powders were evaluated by a test cell in accordance with the above-described capacity measurement method.

It was seen that, while the discharge capacity was improved with any of the added phosphorus compounds, the effect of addition was in the sequence of the anhydride > monobasic acid salt > dibasic acid salt.

Figure 5:
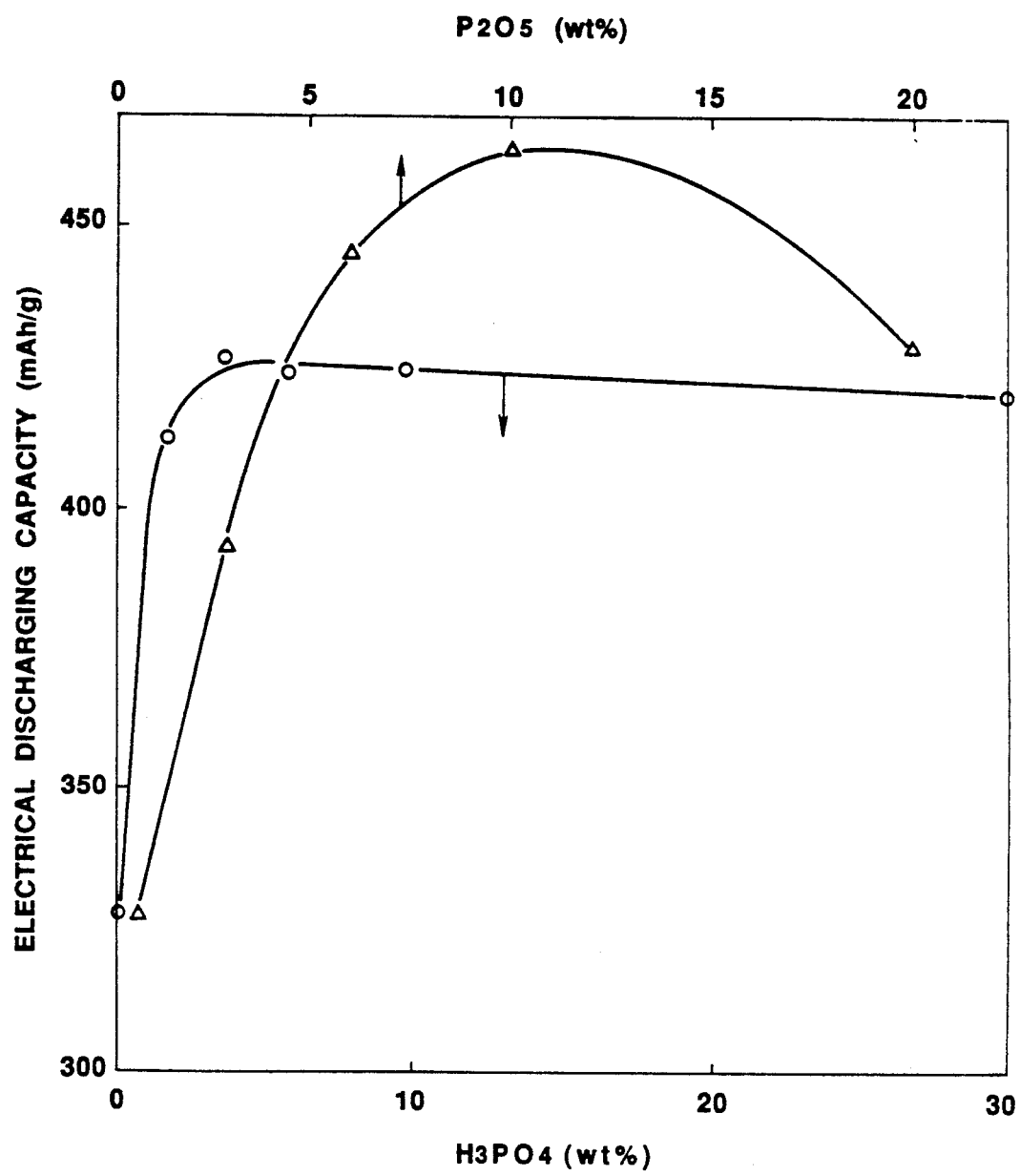
FIG. 5 is a graph showing the relation between the charging capacity and the quantity of addition of orthophosphoric acid and phosphorus pentaoxide to an oxygen-crosslinked petroleum pitch.

FIG. 5 shows the relation between the amount of addition of the phosphorus compounds (phosphorus pentaoxide and orthophosphoric acid) to the carbonic precursor and the discharging capacity. It is seen that the addition of orthophosphoric acid in an amount of about 5 wt % led to the maximum discharging capacity, with the discharging capacity remaining substantially constant with increase in the amount of addition. On the other hand, the amount of addition of about 10 wt % of phosphorus pentaoxide led to the maximum discharging capacity, with the discharging capacity tending to be decreased with increase in the amount of addition. It may be said that phosphorus pentaoxide is more effective than orthophosphoric acid.

Table 2 below shows the discharging capacity on addition of typical phosphorus compounds.

TABLE 2

| P compound | addition quatity(wt %) | discharge capacity(mAH/g) |
|---|---|---|
| — | — | 400 |
| $NA_2HPO_3.5H_2O$ | 8.8 | 421 |
| $Na_2HPO_4.2H_2O$ | 6.7 | 431 |
| $P_2O_5$ | 5.8 | 494 |
| $P_2O_5 + H_2O$ | 5.8 | 466 |
| $H_3PO_4$ | 4.0 | 436 |

Meanwhile, if the material is used as an anode of the non-aqueous electrolyte cell, it may be contemplated that the distance between adjacent (002) planes as found by the X-ray diffraction method and the temperature of heat emission peak in the DTA curve in air atmosphere are closely related with cell characteristics.

It was now checked what changes were brought about in the distance between adjacent (002) planes and the DTA peak temperature by the addition of the phosphorus compounds, and how these changes were associated with the characteristics.

Figure 6:
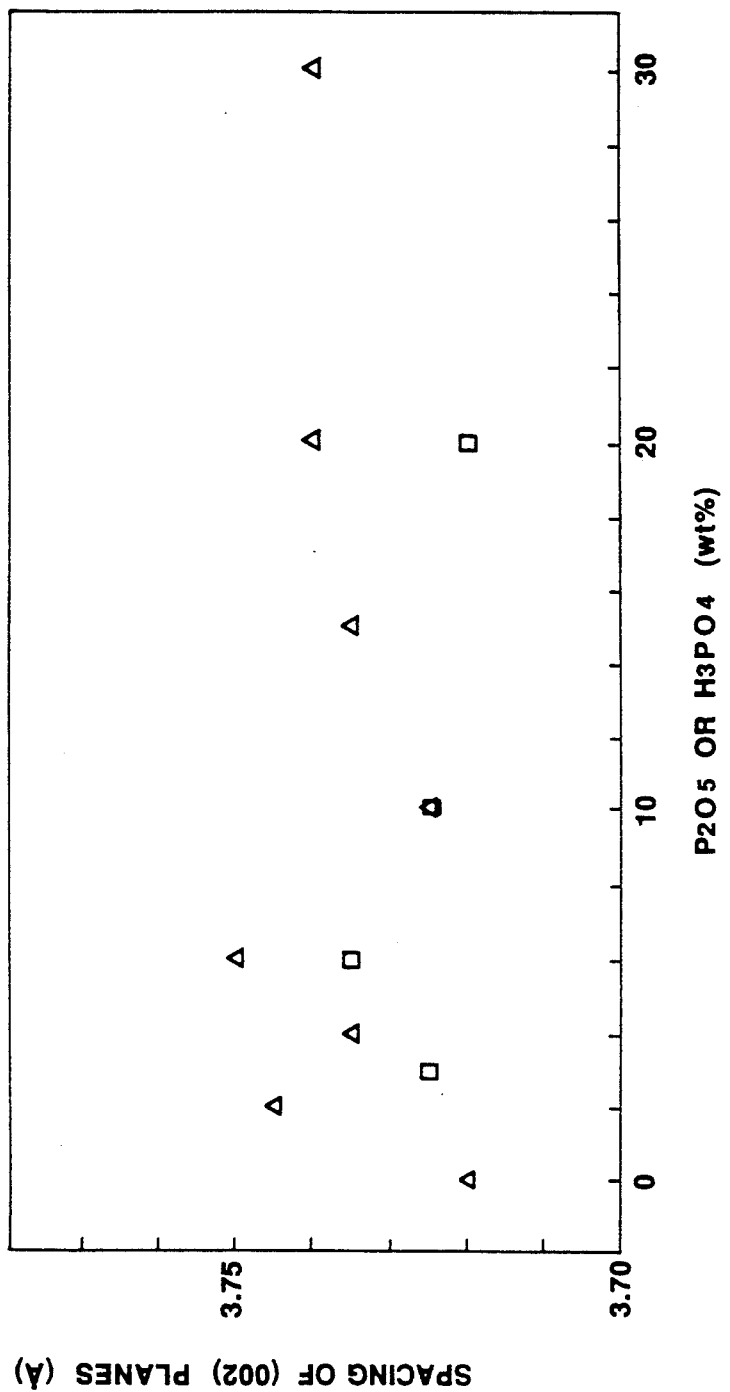
FIG. 6 is a graph showing changes in $d_{002}$ by addition of phosphorus compounds in an oxygen-crosslinked petroleum pitch sintered body.
Figure 7:
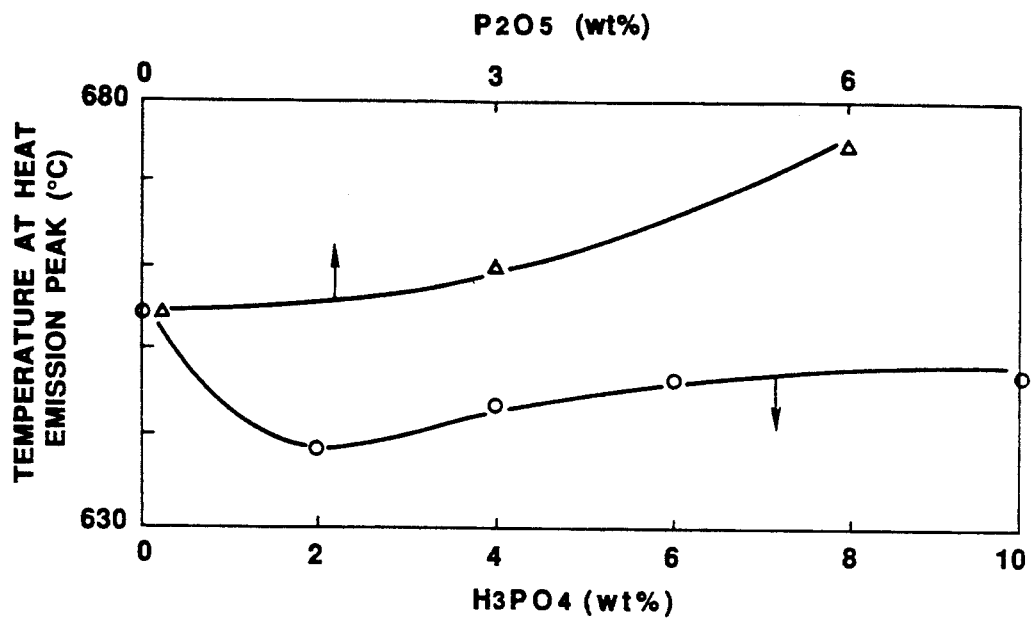
FIG. 7 is a graph showing temperature changes in the DTA peak by addition of phosphorus compounds in an oxygen-crosslinked petroleum pitch sintered body.

These results are shown in FIGS. 6 and 7, respectively. It may be assumed that the changes in the parameters caused by addition of the phosphorus compounds were not significant, these changes in the parameters not being associated monistically with the improvement in characteristics, and that some other contributing factors were operating.

Figure 8:
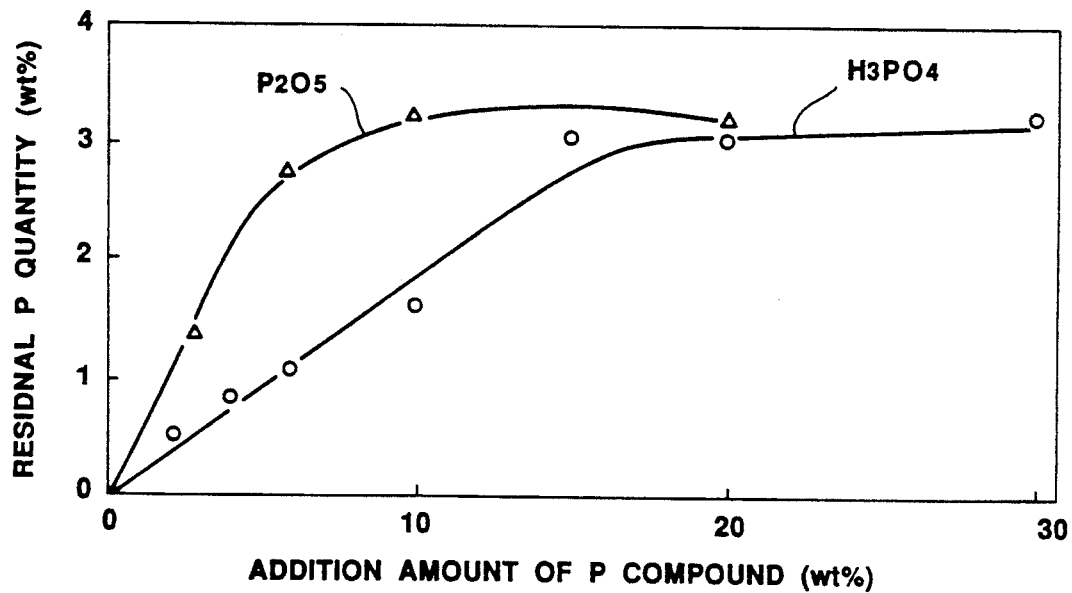
FIG. 8 is a graph showing the relation between the quantity of addition of the phosphorus compound and the quantity of residual phosphorus in the oxygen-crosslinked petroleum pitch sintered body.

It was also checked to what extent phosphorus remained on addition of the above-mentioned phosphorus compounds. The residual phosphorus quantity was measured in the same manner as in the preliminary experiment 1. The results are shown in FIG. 8.

It was seen that, with increase in the amount of addition of the phosphorus compound, the amount of residual phosphorus in the C—P—O compound was naturally increased, and that the amount of the residual phosphorus tends to be saturated at about 3 wt %.

Thus it may be said that the amount of the residual phosphorus of 0.2 to 5 wt % is desirable, with the amount of 0.5 to 3 wt % being most preferred.

Analyses were then conducted into the state of presence of the residual phosphorus which is critical in the sense of seeking into the cause of the effect brought about by the addition of the phosphorus compound.

Four measurement samples were prepared, that is, a sample obtained by first oxidizing the petroleum pitch (H/C atomic ratio of 0.6 to 0.8) to produce a carbonic precursor having an oxygen content of 15.4 wt %, adding 10 wt % of phosphorus pentaoxide to the carbonic precursor and heat-treating the resulting mass in a nitrogen atmosphere at 500° C. for five hours, and three samples obtained by milling the heat-treated precursor, charging the resulting powders in a crucible and sintering the powders in a nitrogen stream under the conditions of the temperature raising rate of 5° C./minute and the holding time at the maximum reached temperatures of one hour, with the maximum reached temperatures of 800°, 1000° and 1300° C. Using these four samples, the state of presence of phosphorus was analyzed by measuring $^{31}P$ solid high resolution NMR and XPS (X-ray photoelectron spectroscopy).

Figure 9:
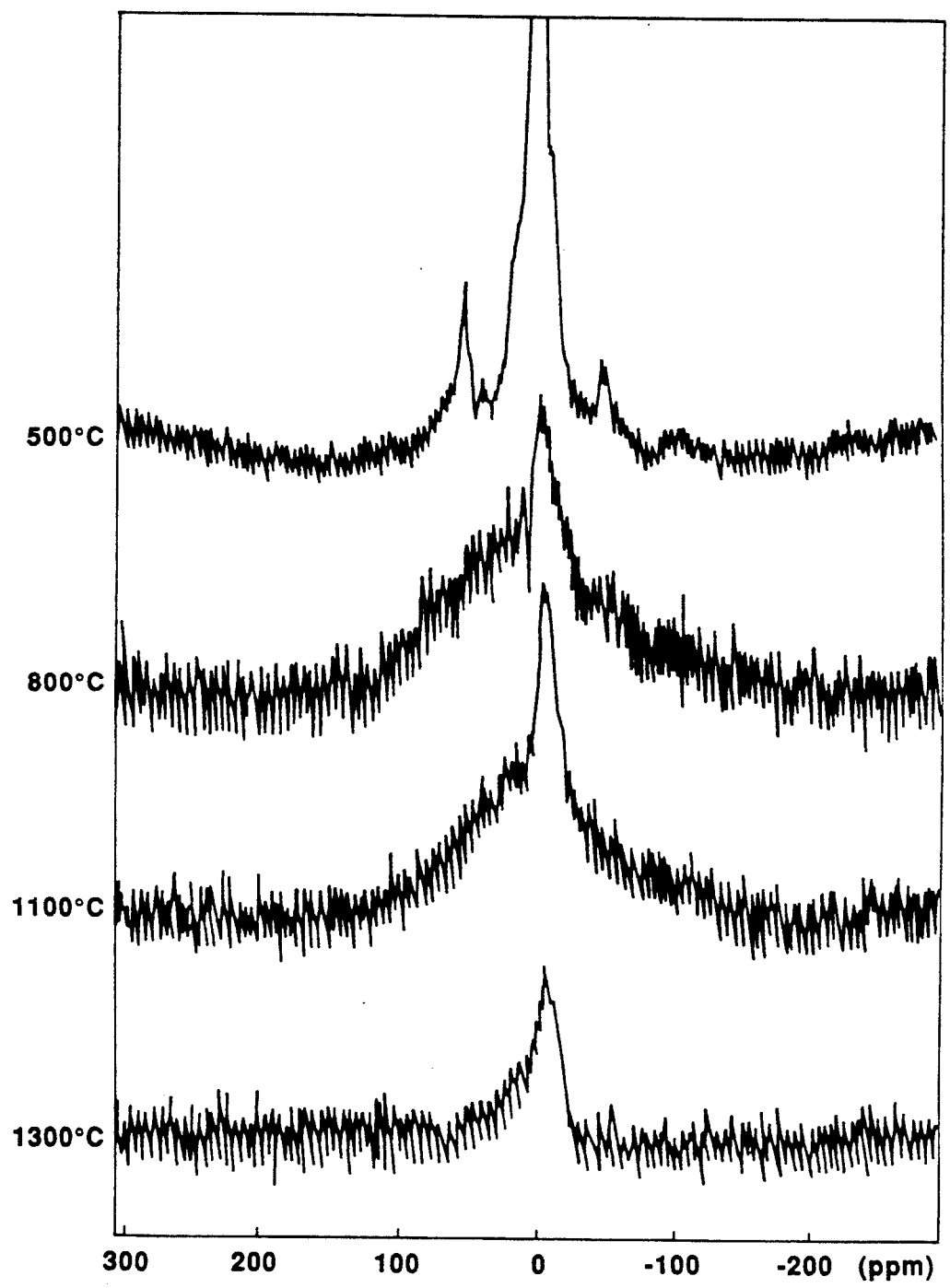
FIG. 9 shows a $^{31}P$ solid NMR spectrum.
Figure 10:
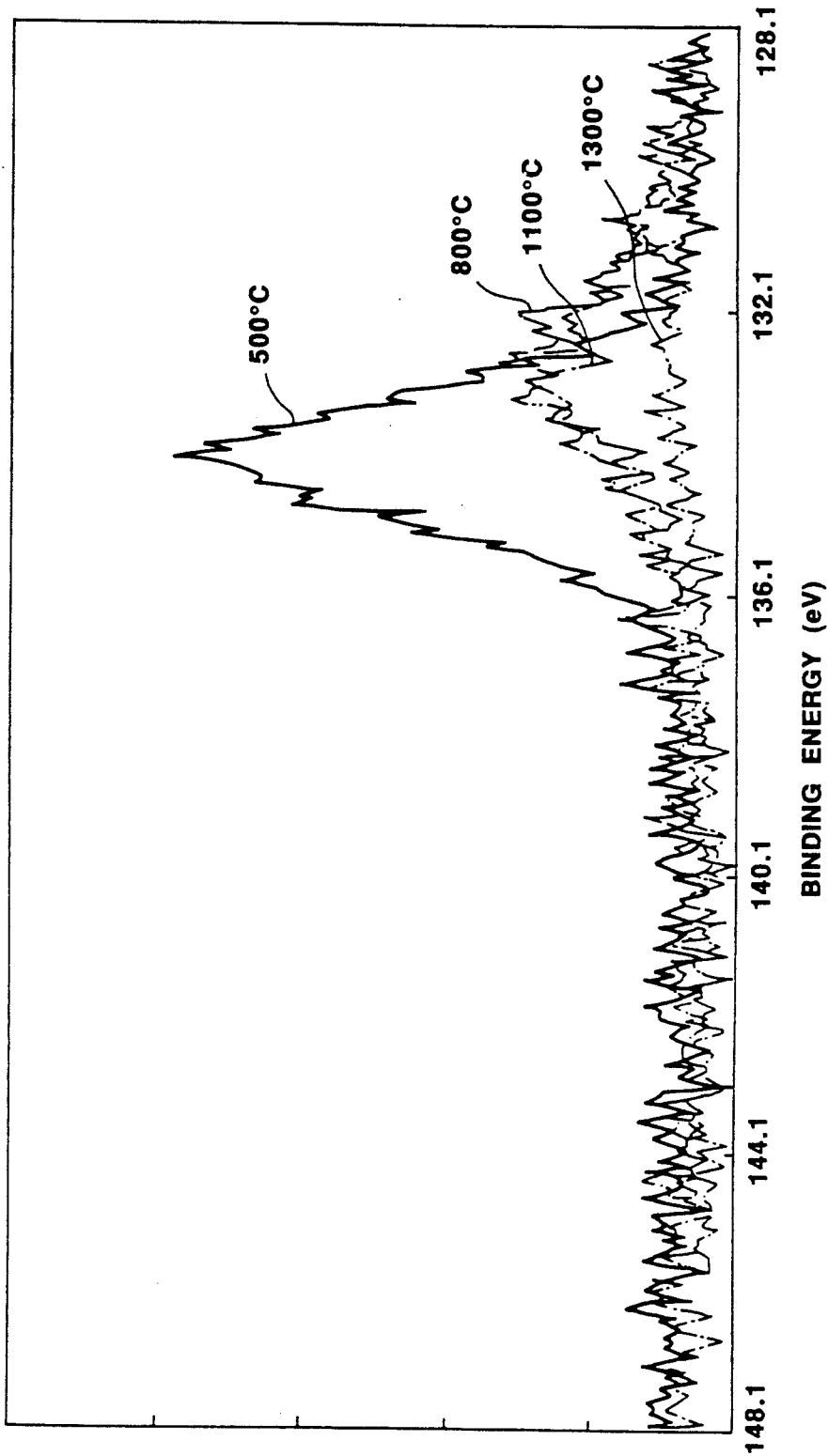
FIG. 10 shows a spectrum of a 2p orbital of a phosphorus atom by XPS.

The results of analyses by $^{31}P$ solid high resolution NMR and the spectrum of XPS (phosphorus atom, 2p orbital) are shown in FIGS. 9 and 10, respectively.

The results of NMR indicate that the main peak of phosphorus pentaoxide is found at 0 ppm at the sintering temperature of 500° C., and the side bands are found at ±50 ppm, showing that a substantial amount is left. Besides, peaks may be noticed at about −10 ppm and at about 20 ppm as shoulders of the main peak. Another peak may be noticed at about 40 ppm.

At 800° C., the peak proper to phosphorus pentaoxide disappeared, with the main peak being about −10 ppm. The peak at 500° C., although small in size, is still left.

At 1100° C., the main peak remains unchanged, while the strength is almost the same as that at 800° C. From this it may be thought that the residual phosphorus quantity is also approximately the same. Other peaks disappeared, except that small bumps, which are probably side bands, may be noticed on both sides of the main peak.

The position or the shape of the main peak are not changed from those at 1100° C. However, it may be assumed that the strength as well as the residual phosphorus quantity is decreased.

It may be seen from the above results that the main peak which persists from 800° C. on may be attributable to the compound which is produced by the reaction between the carbonic material and phosphorus during sintering. Closest to the peak of about −10 ppm were −8.9 ppm of a reference compound $(C_6H_5)_3P$ or −12.7 pm of another reference compound $(C_6H_5O)_2P(=O)$-(OH). However, clear distinction could not be made because of the broad peak shape.

The 2p orbital binding energy of the phosphorus compound by XPS, as found by NMR, exhibited a difference of about 4 eV. Because of the significant difference in the oxidized state, it was found that distinction could be easily made by XPS.

The results of XPS are hereinafter discussed.

Figure 11:
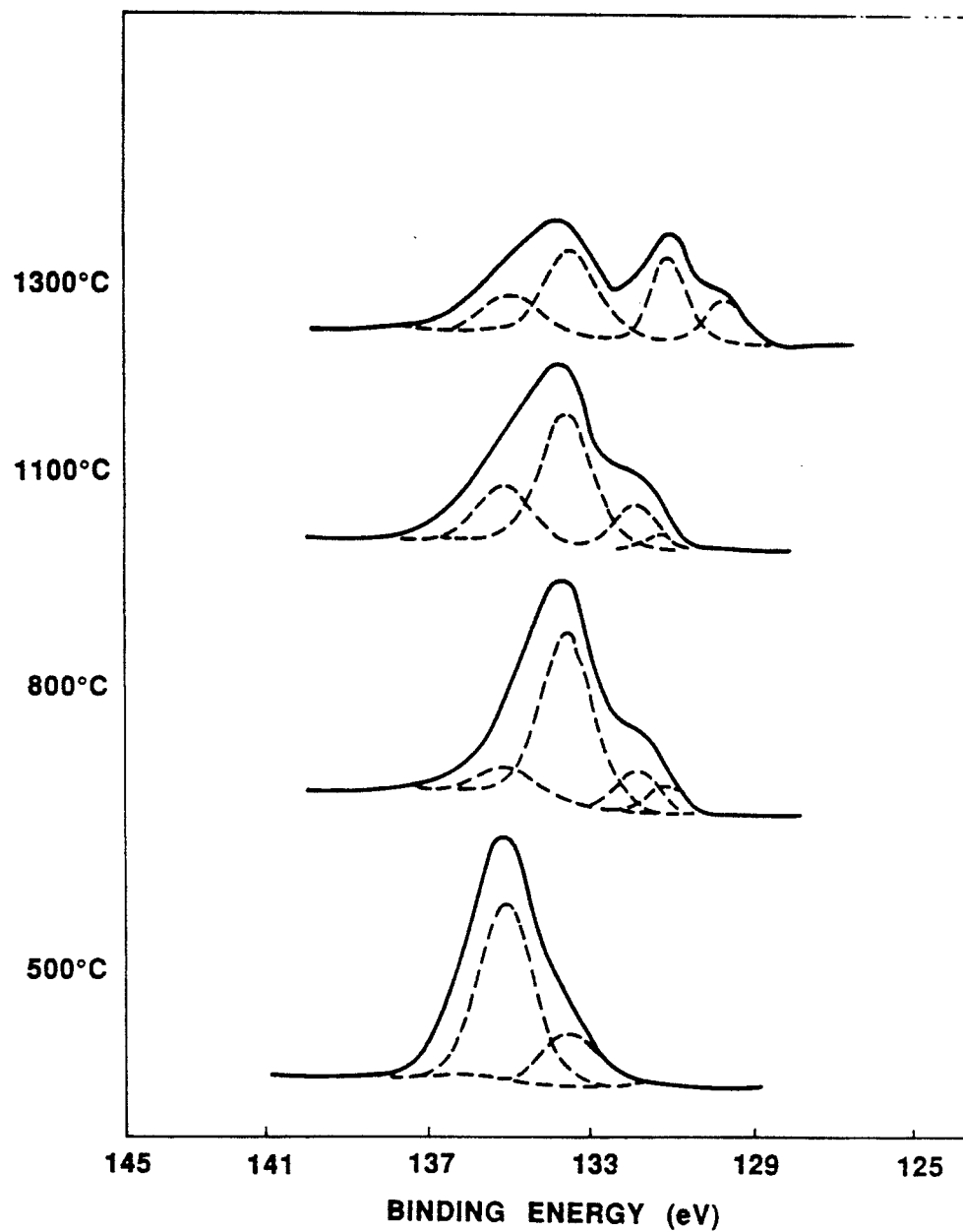
FIG. 11 shows the spectrum of FIG. 10 after curve fitting.

FIG. 11 shows the XPS spectrum after curve fitting and Table 3 shows the compound identified thereby and the P/C atomic ratio.

TABLE 3

| compounds present | sample sintering termperature(°C.) | | | |
|---|---|---|---|---|
| | 500 | 800 | 1100 | 1300 |
| P/C atomic ratio | 0.002 | 0.013 | 0.012 | 0.005 |
| $P_2O_5$ | 1.9% | — | — | — |
| $(C_6H_5O)_2P(=O)(OH)$ | 75.4% | 10.8% | 23.7% | 18.2% |
| $(C_6H_5)_2P(=O)(OH)$ | 22.8% | 67.9% | 55.9% | 40.1% |
| $(C_6H_5)_3P=O$ | — | 13.5% | 15.1% | — |
| $(C_6H_5)_3P$ | — | 7.8% | 5.3% | 26.1% |

TABLE 3-continued

| compounds | sample sintering termperature(°C.) | | | |
|---|---|---|---|---|
| present | 500 | 800 | 1100 | 1300 |
| P (element) | — | — | — | 15.6% |

It is seen that the P/C atomic ratio is decreased significantly at 500° to 800° C., which corresponds to the disappearance of the peak of phosphorus pentaoxide in the NMR spectrum. It is also seen that, although not changed up to 1100° C., the P/C atomic ratio is significantly decreased at 1300° C.

As for the compounds, $(C_6H_5O)_2P(=O)(OH)$ was predominant, while the presence of $(C_6H_5)_3P$ was not noticed. It was also seen that, with rise in the sintering temperature, the compound consisting in direct C—P linkage tended to be predominant, until ultimately phosphorus itself was reduced to $(C_6H_5)_3P$ and thence to element phosphorus.

From the results of XPS, it was seen that, since $(C_6H_5)_3P$ was not present at 500° C., the peak at about $-10$ ppm in NMR was attributable to $(C_6H_5O)_2P(=O)$- $(OH)$.

From the fact that, in the industrial manufacture of phosphorus, carbon is reacted at 1100° to 1400° C. with oxygen of phosphoric acid to remove oxygen in the form of a carbon monoxide gas, phosphorus tends to be reduced more readily towards the surface. Thus, it has been found that the composition is not changed despite changes in the sintering temperature from the results of NMR as the bulk information, while it has been found by XPS that phosphorus undergoes reduction at a region closest to the surface. It may be proved from the above results that the above-mentioned anode material is mainly a compound the inner composition of which has a C—O—P linkage, while the surface composition is a particular compound having reduced carbon-phosphorus linkage in addition to the carbon-oxygen-phosphorus (C—O—P) linkage.

Based on the above-described preliminary experiments, phosphorus compounds were added to an organic material or a precursor which is a petroleum pitch having the oxygen content increased. The resulting mass was sintered, and a non-aqueous liquid electrolyte secondary cell was assembled, using the sintered mass, and characteristics of the cell were scrutinized.

Inspection with Petroleum Pitch

A petroleum pitch having an H/C atomic ratio in the range of 0.6 to 0.8 was pulverized and oxidized in an air stream to produce a carbonic precursor. The quinoline insoluble content of the carbonic precursor (as measured by JIS centrifugal method: K2425-1983) was 80%, while the oxygen content (as measured by a method of an organic elementary analysis) was 15.4 wt %.

6 wt % of phosphorus pentaoxide $(P_2O_5)$ were then added to this carbonic precursor and the resulting mass was maintained in a nitrogen stream at 500° C. for five hours. The temperature was then raised to 1100° C. for heat treatment for one hour.

Using the C—P—O compound, prepared in this manner, the following cell as prepared.

The C—P—O compound was pulverized in a mortar and screened through a mesh. The powders with a particle size of 390 mesh or less were used.

To 1 g of the powers, 10 mg of polyvinylidene fluoride were added as a binder. The mass was processed into a paste with dimethylformamide and applied to a stainless steel screen and pressed under a dry pressure of 5 tons/cm². The resulting product was punched and used as an anode. The net active material weighed 32.4 mg.

For preparing a cathode, 6 g of graphite powders and 3 g of polytetrafluoroethylene were added to 91 g of $LiNi_{0.2}Co_{0.8}O_2$ as an active material, and the resulting mass was mixed thoroughly, 1 g of the resulting mixture was charged into a mold and compression molded at a pressure of 2 ton/cm² to produce a disc-shaped electrode.

Using the above-mentioned cathode and anode, a solution of $LiClO_4$ at a rate of 1 mol/lit in a 1:1 (volume ratio) mixed solvent of propylene carbonate and 1,2-dimethoxyethane, as a liquid electrolyte, and a polypropylene non-woven fabric, as a separator, another coin-shaped electrode (Example 1) was prepared. Meanwhile, the cell was constructed so that the amount of the active material at the cathode is significantly larger than that at the anode in terms of the electrochemical equivalent and the anode is the controlling electrode.

A coin-shaped electrode (Comparative Example 1) was prepared in the same manner as in Example 1, except that phosphorus pentaoxide was not used.

Figure 12:
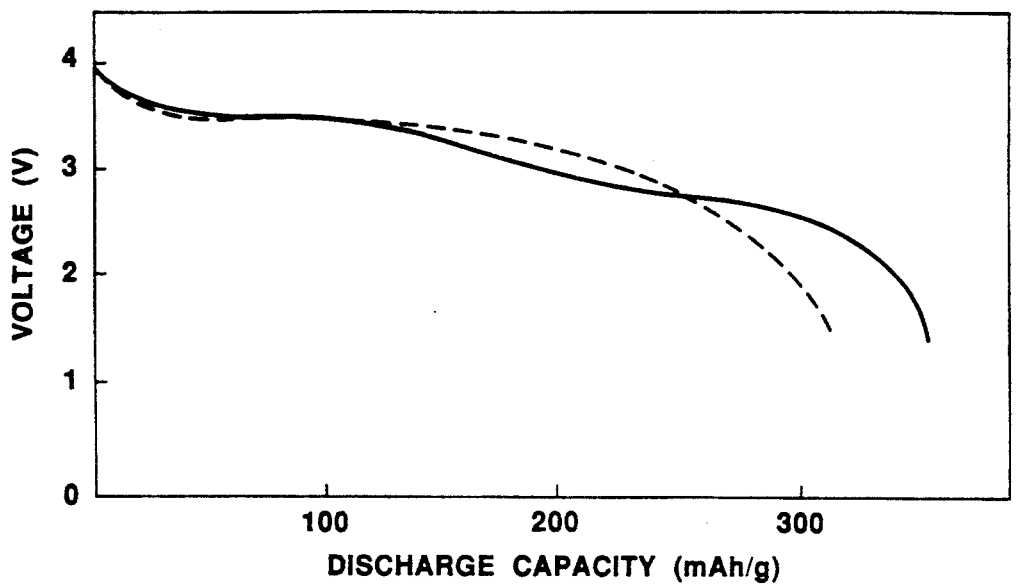
FIG. 12 is a graph showing discharge curves for Example 1 and Comparative Example 1.

A discharge curve was drawn for Example 1 and Comparative Example 1. The results are shown in FIG. 12. A solid line and a broken line in FIG. 12 indicate a charging curve and a discharging curve, respectively.

It is seen from FIG. 12 that a markedly superior capacity may be obtained by sintering with addition of the phosphorus compound.

Charging/discharging cyclic characteristics were checked for Example 1 and Comparative Example 1. For charging/discharging tests, the current density was set to a constant value of 0.53 mA/cm², while the discharging cut-off voltage was set to 1.5 V. The results are shown in FIG. 13.

Figure 13:
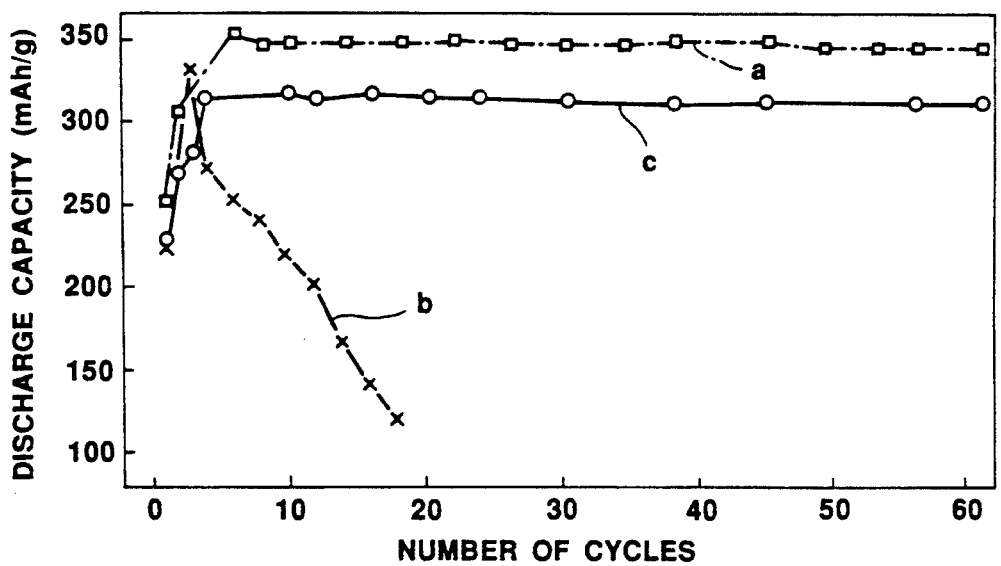
FIG. 13 is a graph showing cycle characteristics of Example 1 and Comparative Example 1.

In FIG. 13, curves a, b and c represent charging/discharging cyclic characteristics when Example 1 was charged at 360 mAH/g, Comparative Example 1 was charged at 360 mAH/g and Comparative Example was charged at 320 mAH/g, respectively.

Example 1 shows good charging/discharging cycle characteristics when charging was made at 360 mAH/g, whereas Comparative Example 1 has an extremely short durability. Comparative Example 1 shows good charging/discharging cyclic characteristics when charging was made at 320 mAH/g, however, it has a limited discharging capacity.

Scrutinies with Novolak Phenolic Resin

An amount of 10 g of pure water and 1 g of ethanol were added to 10 g of powders of Novalak type phenolic resin, manufactured by GUN-EI KAGAKU-SHA under the trade name of XPG A 4552 B for mixing and wetting, and 500 mg of a 85%-aqueous solution of phosphoric acid was added to the resulting mixture and mixed thoroughly.

After the mixture was maintained for five hours at 500° C. in a nitrogen atmosphere, and the temperature was raised to 1200° C., the mixture was heat-treated for one hour. The resulting compound had the following physical properties:

| Distance between (002) Planes | 3.75 Å |
|---|---|
| True Density | 1.60 g/cm³ |

| -continued | |
|---|---|
| DTA Heat Emission Peak | 631° C. |
| P content | about 0.8 wt% |
| Peak Chemical Shift in $^{31}$P Solid NMR | −11 ppm |
| Surface Composition/Amount of P by XPS Spectrum | $(C_6H_5O)_2P(=O)(OH)/17.7\%$ $(C_6H_5O)_2P(O=)(OH)/35.9\%$ $(C_6H_5)_3P=O/26.0\%$ $(C_6H_5)_3P/20.4\%$ |

Using powders of the C—P—O compound, obtained in the above-described manner, as the active material for the anode, a cell similar in structure to Example 1 was tentatively prepared (Example 2). The net quantity of the active material for the anode was 32.5 mg.

After charging/discharging cyclic tests at various charging and discharging capacities, it was found that stable charging and discharging could be carried out with the charging/discharging quantities of 360 mAH/g or less.

Figure 14:
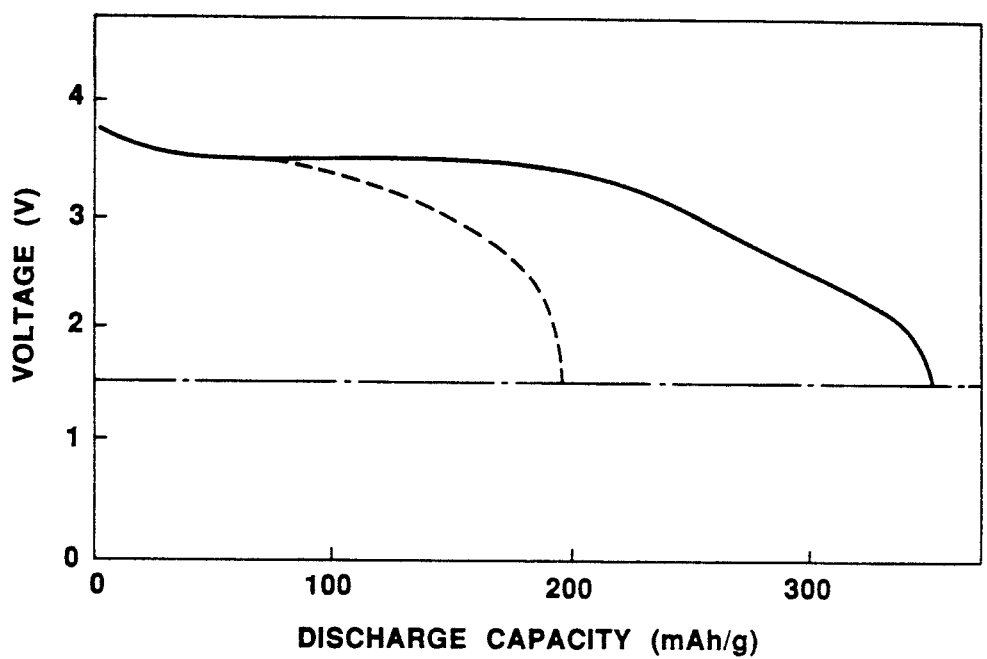
FIG. 14 is a graph showing discharge curves of Example 1 and Comparative Example 1.

A discharge curve for a charging/discharging at 360 mAH/g is shown by a solid line in FIG. 14.

Another cell (Comparative Example 2) was prepared in the same manner as in Example 2 except not adding phosphoric acid to novolak type phenolic resin powders and charging/discharging cyclic tests were conducted at various charging/discharging capacities.

It was found that stable charging/discharging could be achieved for the charging quantity of the order of 210 mAH/g at most.

A discharge curve for charging at 210 mAH/g is shown by a broken line in FIG. 14.

EXPERIMENT 2

In the present Experiment, the effect by P content in the easily graphatizable carbon was checked.

Preliminary Experiment

An amount of $P_2O_5$ was added (in a constant quantity of 5 wt %) to acenaphthylene ($C_{12}H_8$, a reagent manufactured by WAKO JUNYAKU SHA), in the crude state and to the same reagent previously heat-treated at 200° to 650° C., and changes in the capacity caused by the heat-treatment temperatures (referred to as addition temperatures) were checked. Besides, phosphorus was quantitated by inductive coupling type plasma emission spectroscopy (ICP).

For preparing the sample, after the temperature of acenaphthylene was raised to the addition temperature, the temperature was transiently lowered. Acenaphthylene was pulverized and added and mixed with $P_2O_5$ and the temperature was again raised to the addition temperature. The resulting mixture was maintained for one hour and, carbonized at 530° C., after which it was sintered at 1100° C. and screened through a 390 mesh so as to be used as a sample. Meanwhile, the temperature raising rate was set to 100° C./hour until carbonization and to 5° C./minute during sintering.

Figure 15:
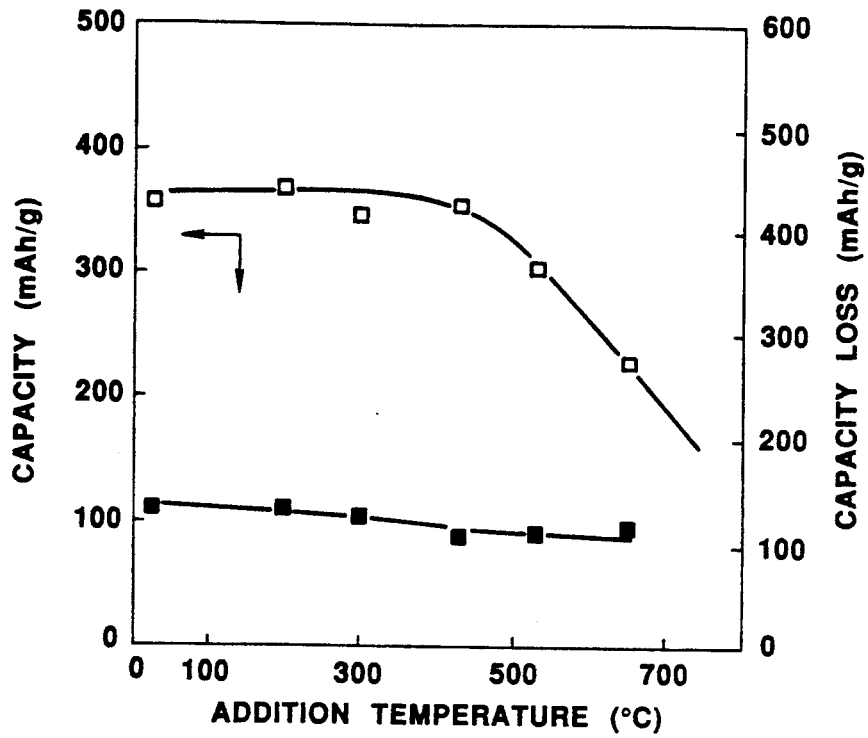
FIG. 15 is a graph showing the relation between the temperature of addition of phosphorus pentaoxide and the capacity as well as capacity loss in acenaphthylene.
Figure 16:
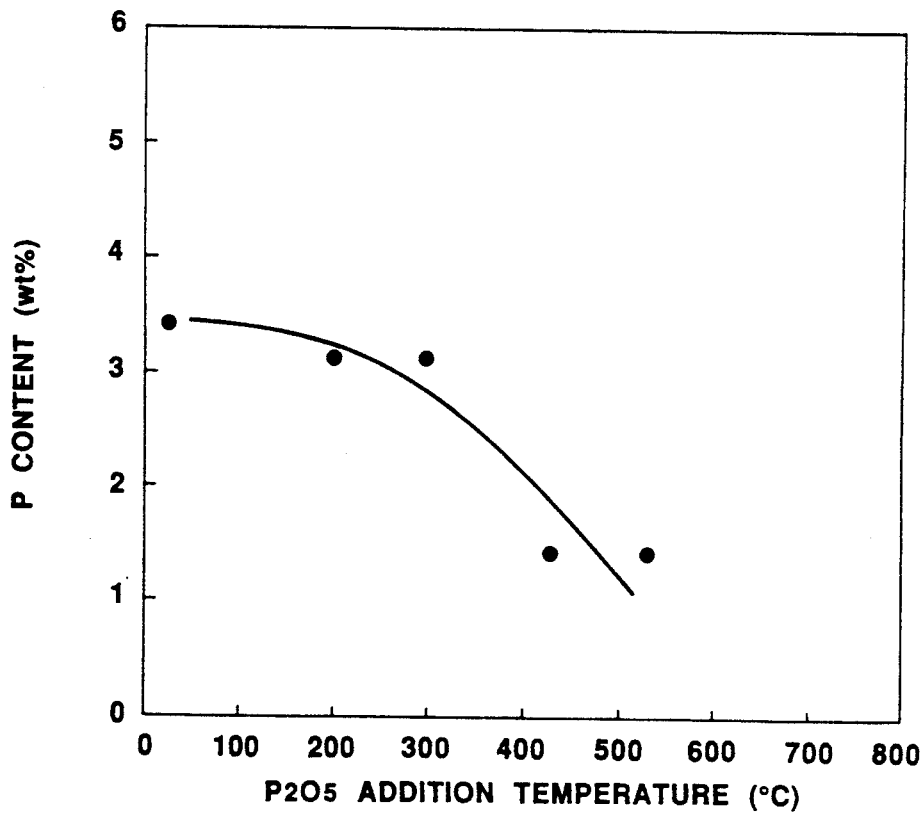
FIG. 16 is a graph showing the relation between the temperature of addition of phosphorus pentaoxide and the phosphorus content in acenaphthylene.

FIGS. 15 and 16 show changes in the capacity ("□") and capacity loss ("■") and changes in P content with respect to the addition temperature, respectively.

The capacity remained substantially constant up to the addition temperature of 430° C. and was lowered at 600° to 700° C. to a capacity comparable to that of the material not added with $P_2O_5$. On the other hand, the P content was lowered at the addition temperature of 300° C. or higher, as shown in FIG. 16. However, if FIG. 15 is taken account of simultaneously, it may be seen that, with the addition temperature of 430° C., the capacity could be increased with a smaller amount of phosphorus.

Scrutinies by Acenaphthylene

An amount of 25 g of acenaphthylene ($C_{12}H_8$, a reagent manufactured by WAKO JUNYAKU SHA) were heated in a nitrogen stream up to 430° C. at a rate of 100° C./hour and subsequently cooled and powdered to a sample. The sample thus produced was added and mixed with $P_2O_5$ and, after the temperature was maintained at 430° C. for one hour, the temperature was raised to 1100° C. to produced a solid precursor, which was further powdered and, after raising the temperature to 530° C., was heat-treated for one hour and cooled to a powdered sample.

The phosphorus content, capacity and capacity losses were measured for the addition amounts of $P_2O_5$ of 3 wt %, 5 wt %, 10 wt %, 15 wt % and 20 wt %, for Examples A, B, C, D and E, respectively. Phosphorus in the powdered sample was quantitated by ICP. The distance of the (d002) plane of the diffraction peak and crystallite thickness (Lc002) were measured by a powder X-ray diffraction method. The true density was simultaneously measured.

Another powdered sample (Comparative Sample A) was prepared in the same manner as in Examples A to E except not adding $P_2O_5$ to acenaphthylene, and the capacity, d002, Lc02 and the true density were measured.

The results are collectively shown in Table 4.

TABLE 4

| | P content (wt %) | capacity (mAh/g) | capacity loss (mAh/g) | Lc002 (Å) | d002 (Å) | true density (g/cm$^3$) |
|---|---|---|---|---|---|---|
| comp. Ex.A | — | 270 | 127 | 25.0 | 3.47 | 2.0 |
| Ex.A | 0.6 | 302 | 103 | 24.4 | 3.49 | 2.0 |
| Ex.B | 1.4 | 355 | 108 | 25.0 | 3.50 | 2.0 |
| Ex.C | 4.0 | 357 | 121 | 24.5 | 3.49 | 2.0 |
| Ex.D | 4.5 | 382 | 118 | 24.9 | 3.52 | 2.0 |
| Ex.E | 6.0 | 360 | 156 | 23.9 | 3.51 | 2.0 |

Figure 17:
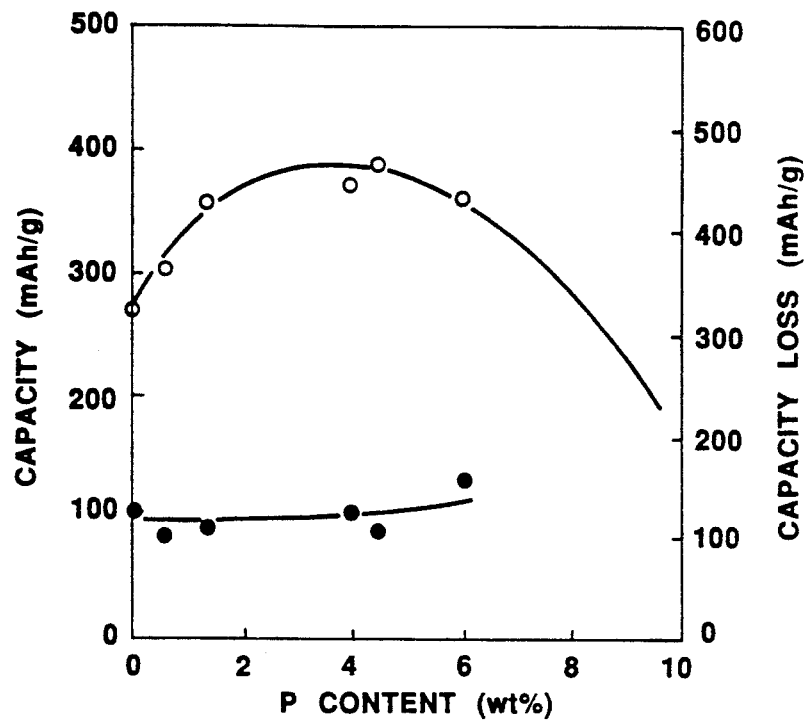
FIG. 17 is a graph showing the relation between the phosphorus content and the capacity as well as capacity loss in acenaphthylene.
Figure 18:
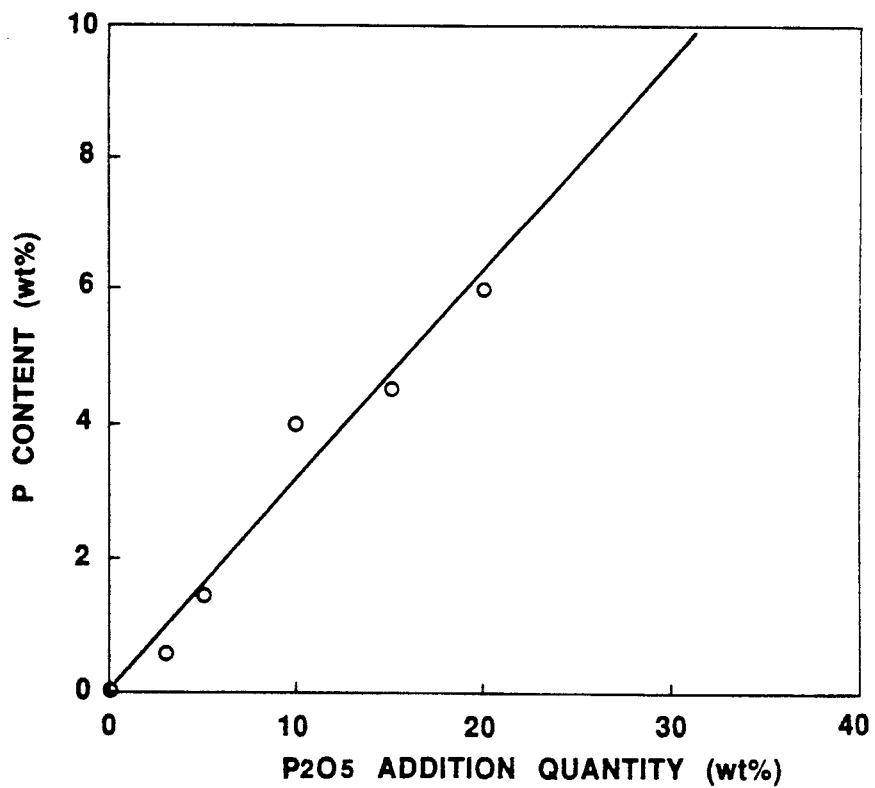
FIG. 18 is a graph showing the relation between the quantity of addition of phosphorus pentaoxide and the phosphorus content in acenaphthylene.
Figure 19:
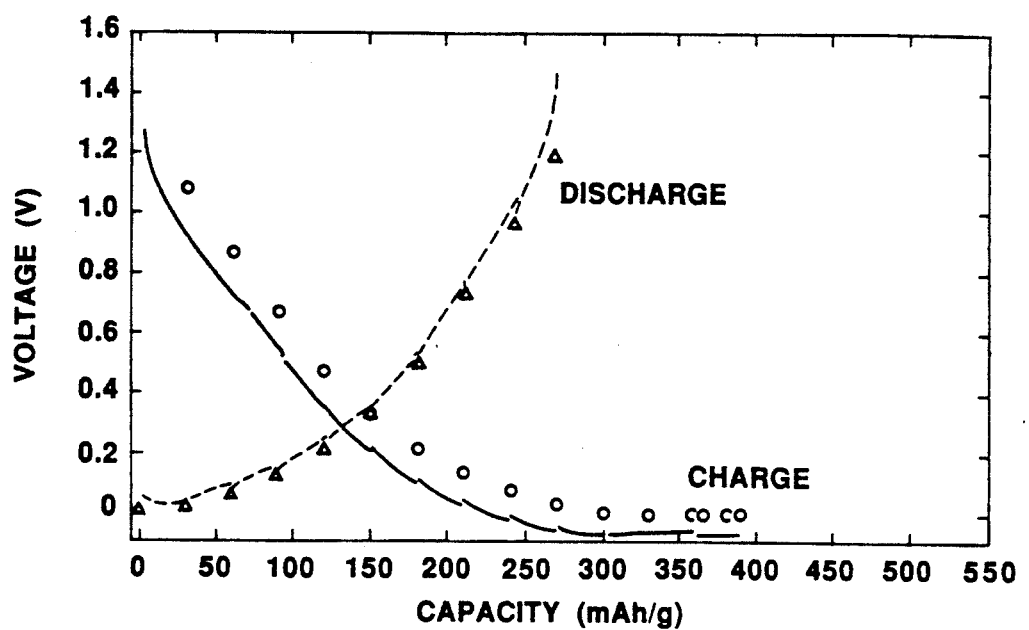
FIG. 19 is a graph showing charge and discharge curves of Comparative Example A.
Figure 20:
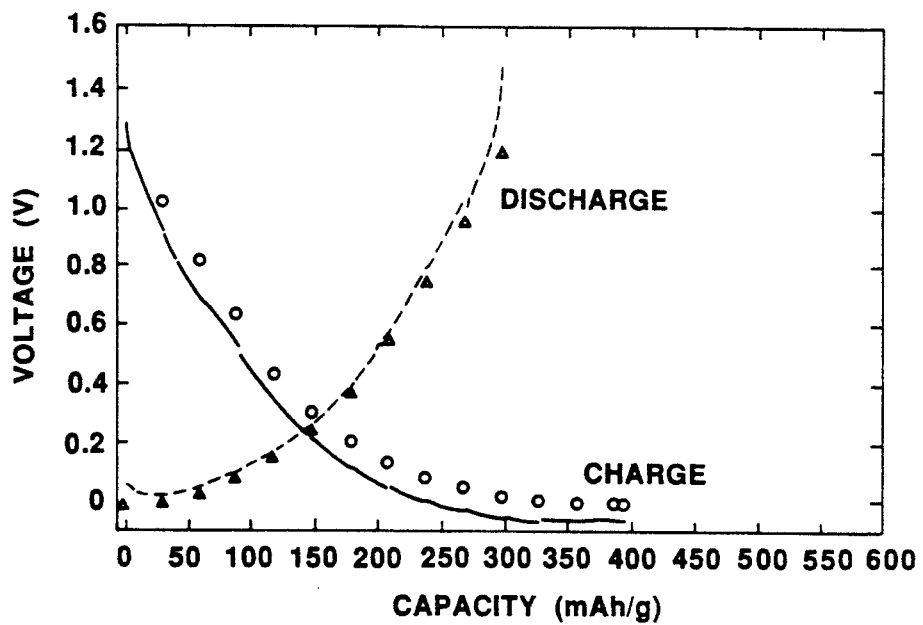
FIG. 20 is a graph showing charge and discharge curves of Example A,.
Figure 21:
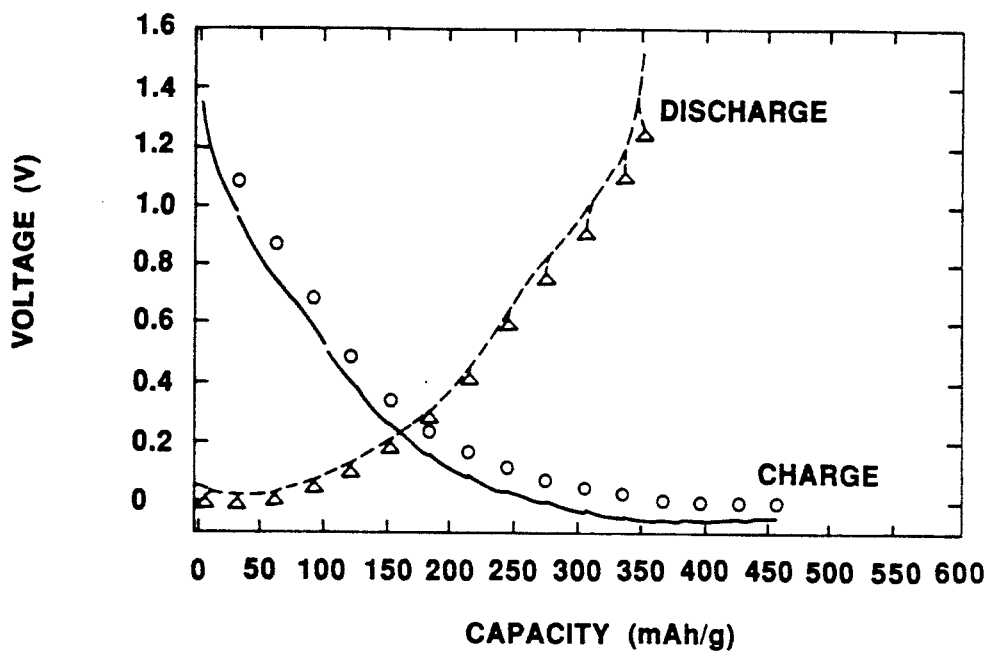
FIG. 21 is a graph showing charge and discharge curves of Example B.
Figure 22:
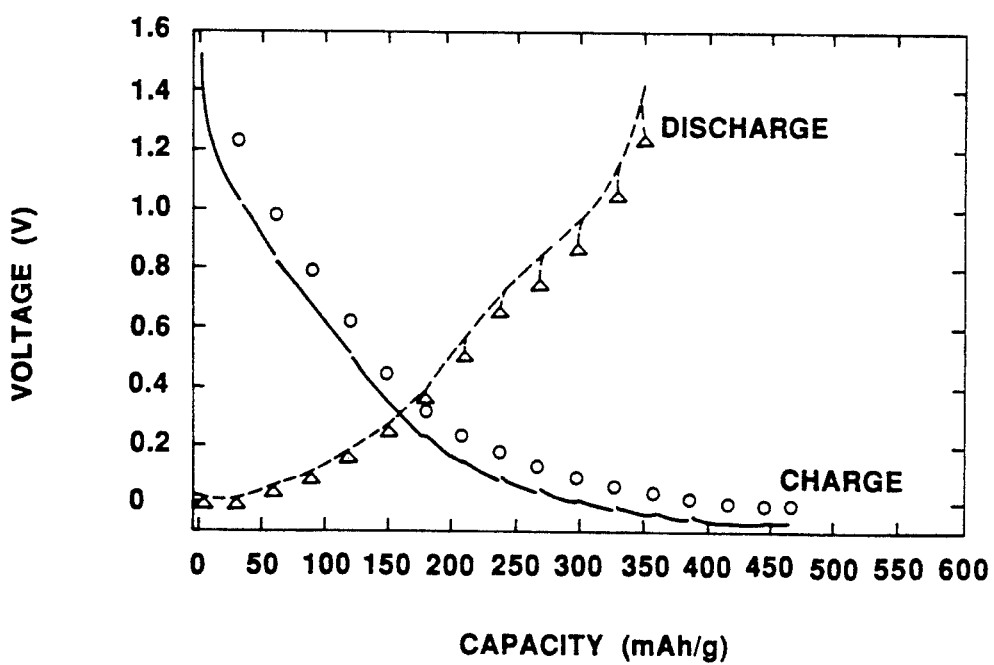
FIG. 22 is a graph showing charge and discharge curves of Example C,.
Figure 23:
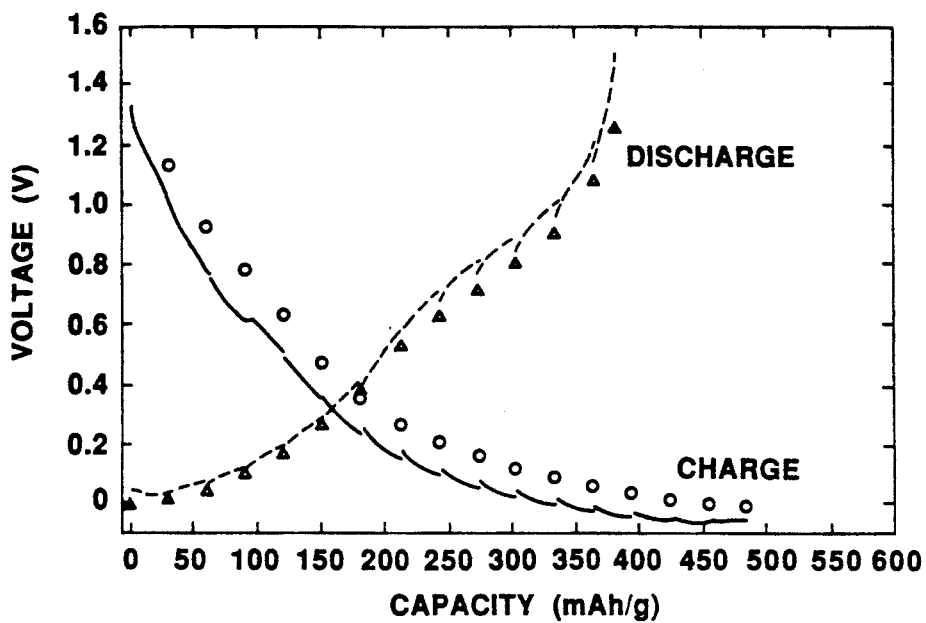
FIG. 23 is a graph showing charge and discharge curves of Example D.
Figure 24:
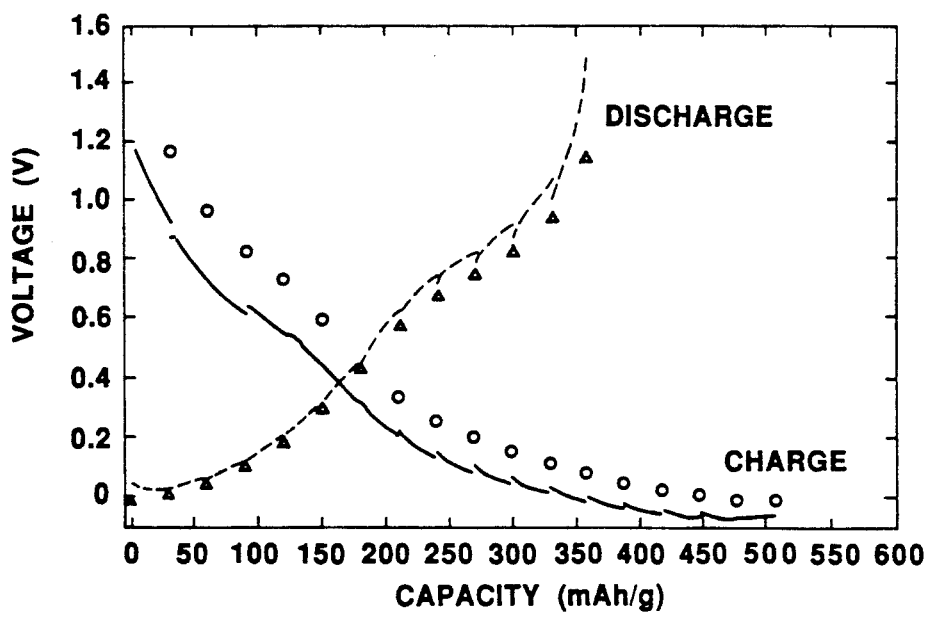
FIG. 24 is a graph showing charge and discharge curves of Example E.

FIGS. 17 and 18 show changes in capacity with variable P content and changes in P content with variable addition amounts of $P_2O_5$, respectively.

FIGS. 19 to 24 show charging/discharging curves for measured values of the capacity for Comparative Example A and Examples A to E, respectively. In the drawing, solid lines indicate closed-circuit voltage in the current-on state, while circle and triangle marks indicate the equilibrium potential after the end of the test.

Using the powder samples of Example D and Comparative Example A, cells for cyclic tests were prepared and used for evaluation. The following are the method for preparing the cell and conditions used for the tests.

A molded electrode prepared in the same manner as with the capacity testing method, using powers of the C—O—P compound as an active material, was used as an anode. For preparing a cathode, 6 g of graphite powders and 3 g of polytetrafluoroethylene were added to 91 g of $LiCoO_2$, used as an active material, and the resulting mass was mixed thoroughly. 1 g of the resulting mixture was charged into a mold and compression molded at a pressure of 2t/cm$^2$ to produce a disc-shaped electrode.

Using the above-mentioned cathode and anode, a solution of LiPF$_6$ at a rate of 1 mol/lit in a 1:1 (volume ratio) mixed solvent of propylene carbonate and 1,2-dimethoxyethane, as a liquid electrolyte, and a polypropylene non-woven fabric, as a separator, another coin-shaped electrode was prepared. Meanwhile, the cell was constructed so that the amount of the active material at the cathode was significantly larger than that at the anode in terms of the electrochemical equivalent and the anode played the part of the controlling electrode.

The charging/discharging cyclic tests were conducted under the conditions that charging was effected with 320 mAH per gram of the active material for the anode and discharge was effected up to the cut-off of 2.5 V.

Figure 25:
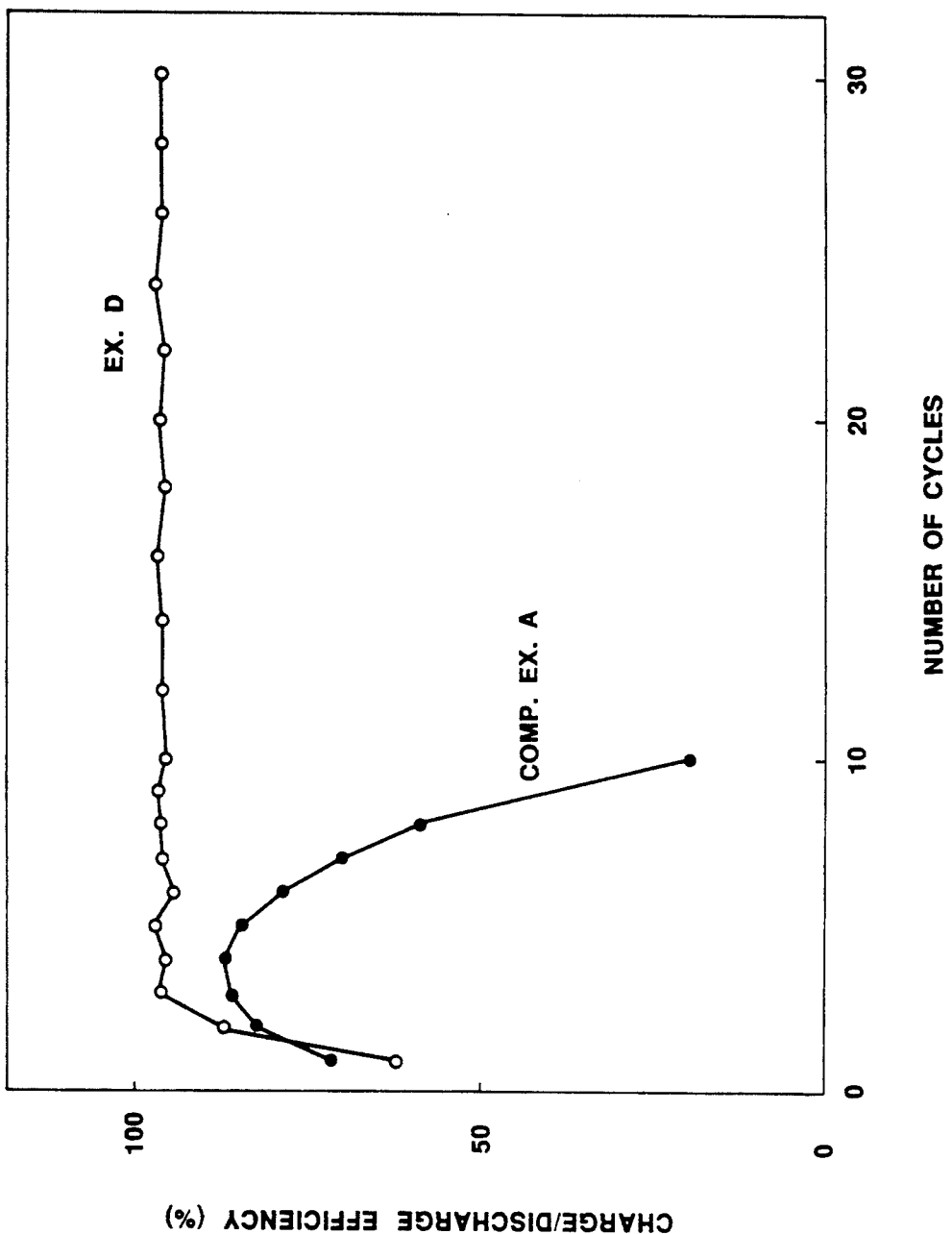
FIG. 25 is a graph showing cyclic characteristics of cells employing Example D and comparative Example A.

The results are shown in FIG. 25, from which it is seen that the sample containing phosphorus exhibited superior cyclic characteristics.

Using the samples of Examples A to E, the state of the presence of phosphorus was analyzed by $^{31}$P solid high resolution NMR and XPS measurement. As for Example C, measurements were made of a sample sintered at 500° C. and a sample sintered at 1300° C., besides a sample sintered at 1100° C.

Figure 26:
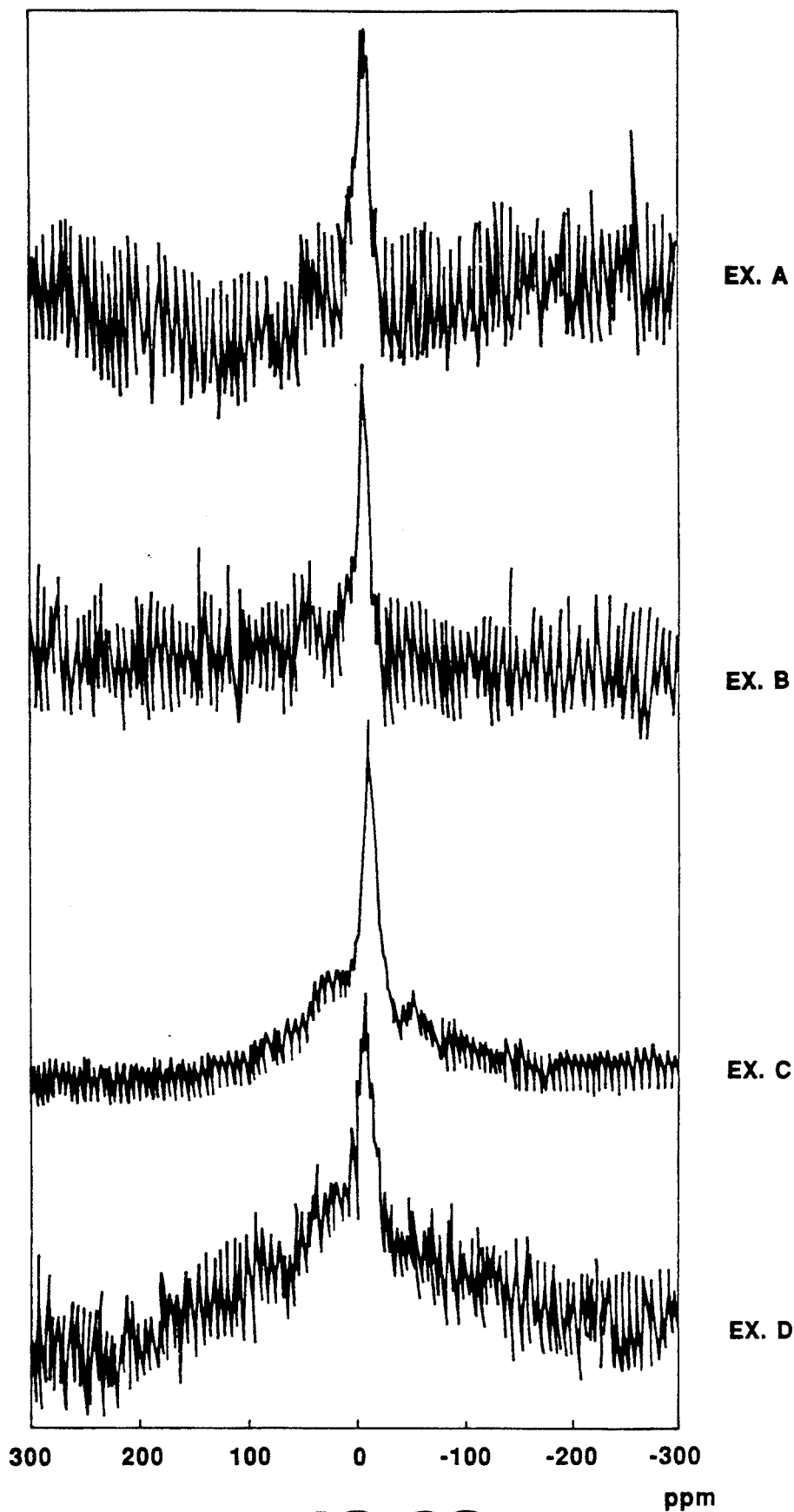
FIG. 26 is a graph showing the difference in the $^{31}P$ solid NMR spectrum by addition quantity of phosphorus pentaoxide in acenaphthylene.
Figure 27:
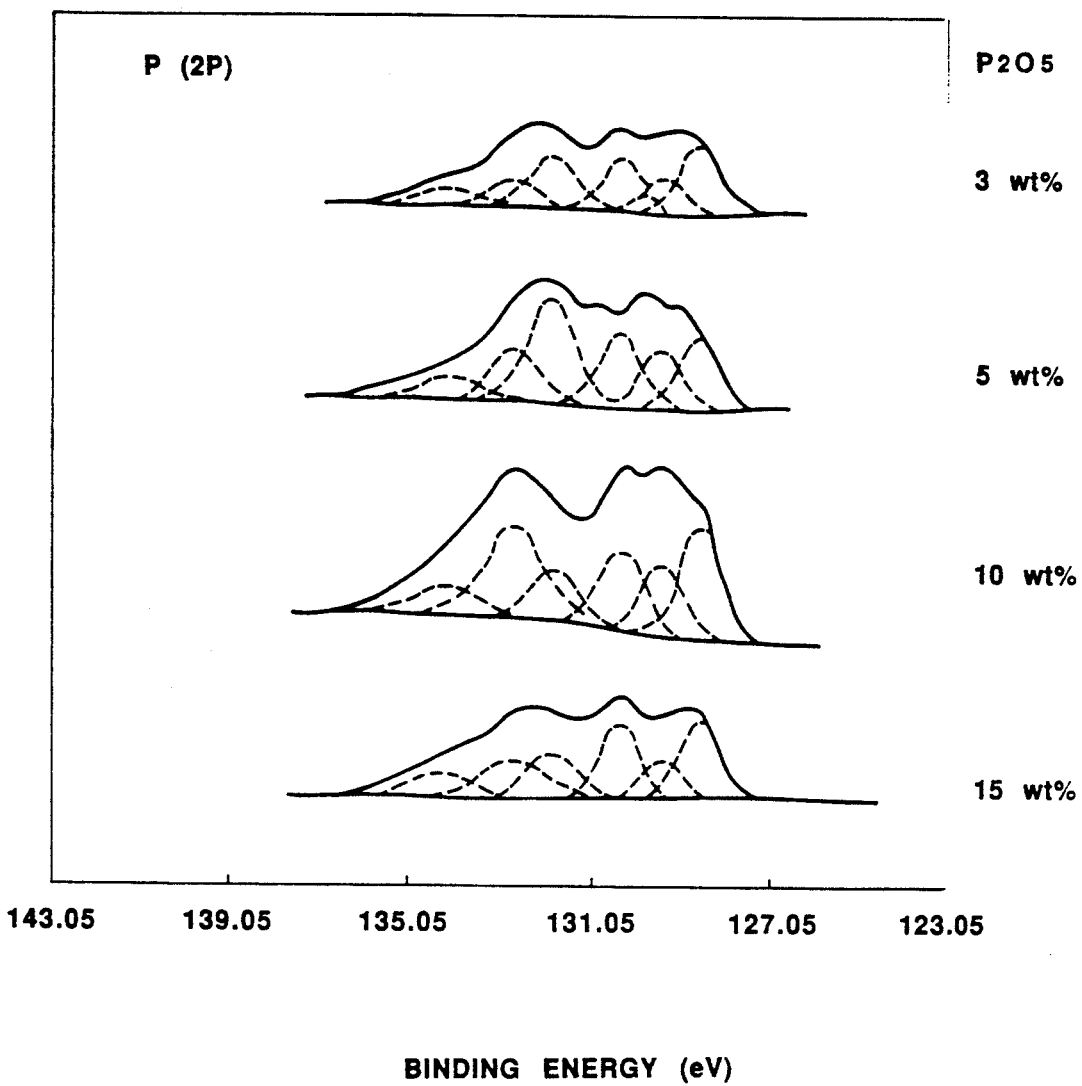
FIG. 27 is a graph showing the difference in XPS spectrum by addition quantity of phosphorus pentaoxide in acenaphthylene.

FIGS. 26 and 27 show the NMR spectrum of the Examples A to E and the XPS spectrum, while Table 5 collectively shows the compositions of the various compounds.

TABLE 5

| compounds present | P$_2$O$_5$ addition amount | | | |
|---|---|---|---|---|
| | 3 wt % | 5 wt % | 10 wt % | 15 wt % |
| P$_2$O$_5$ | — | — | — | — |
| (C$_6$H$_5$O)$_2$P(=O)(OH) | 8.4% | 8.4% | 7.2% | 11.1% |
| (C$_6$H$_5$)$_2$P(=O)(OH) | 13.7% | 10.0% | 25.1% | 18.4% |
| (C$_6$H$_5$)$_3$P=O | 23.5% | 30.9% | 12.3% | 16.7% |
| (C$_6$H$_5$)$_3$P | 19.9% | 18.3% | 18.7% | 23.6% |
| P (element) | 9.7% | 14.7% | 14.1% | 5.9% |
| electron-rich P | 24.8% | 17.7% | 22.6% | 24.2% |

It is seen that NMR exhibited the main peak at about −10 ppm for increased addition amounts of P$_2$O$_5$. On the other hand, the XPS spectrum indicated the existence of element phosphorus and components having a lower binding energy (components having an electron-rich linkage as compared to element P) besides compounds in which a benzene ring is bonded to P.

The components having a low binding energy as compared to element P usually include compounds of phosphorus with other metals. However, the components elements are carbon, oxygen, phosphorus and a small amount of hydrogen, there being no other metals. This phenomenon may be analyzed as follows. That is, the fact that the binding energy is low means that excess electrons are present, so that an electron-donating environment exists. Since the phenomenon has not occurred with difficulty graphatizable carbon added with phosphorous, it may be contemplated that a graphite structure is developed more thoroughly with easily graphatizable carbon and part of element P is affected by η electrons, with the peak position being shifted and presenting itself as component having a low binding energy. (This peak belongs to electron-rich element P and indicates electron-rich P). This phenomenon may be said to be characteristic of the easily graphatizable carbon, such as P-containing coke.

Figure 28:
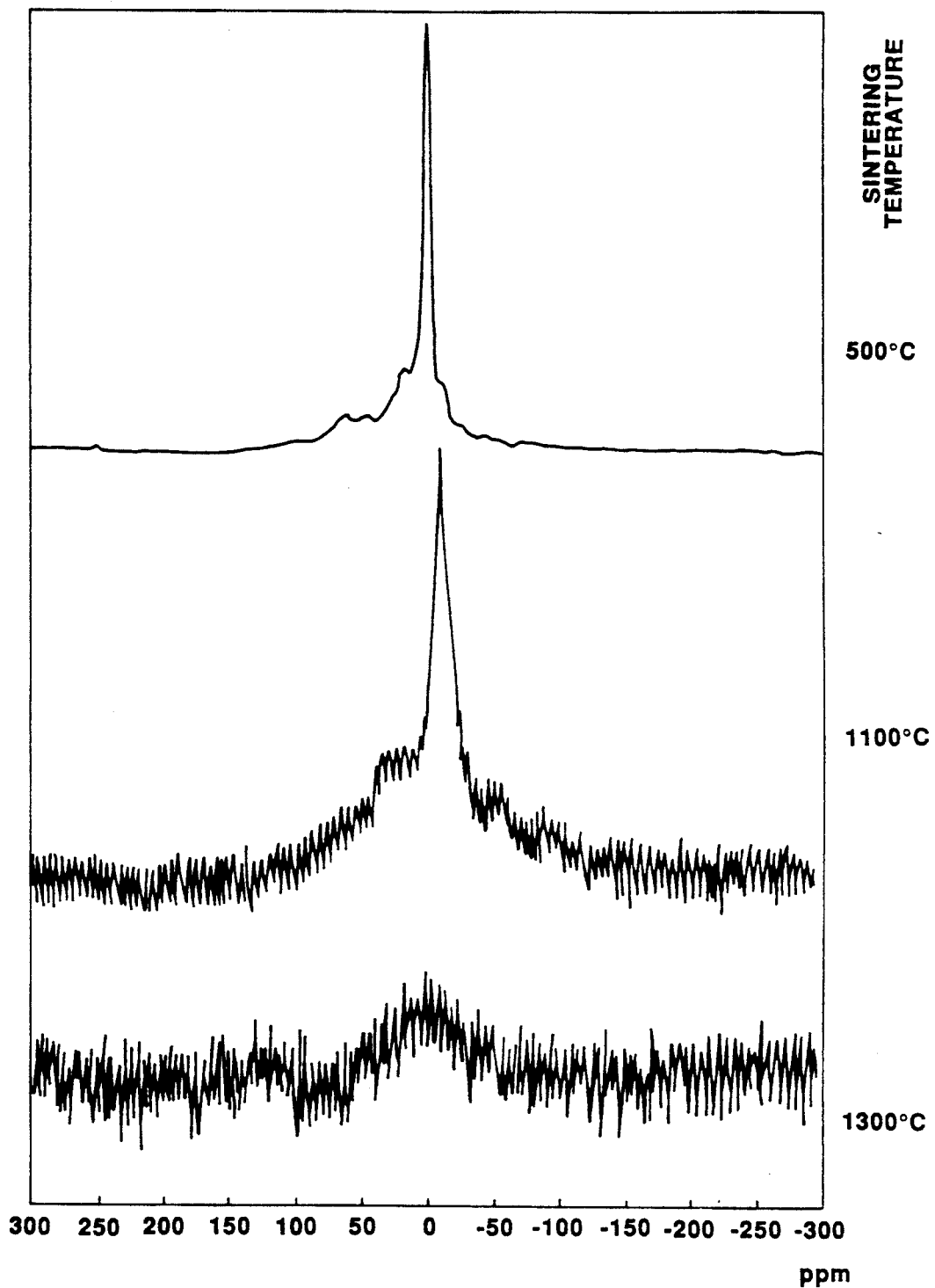
FIG. 28 is a graph showing the difference in the $^{31}P$ solid NMR spectrum by the sintering temperature after addition of phosphorus pentaoxide in acenaphthylene in acenaphthylene.
Figure 29:
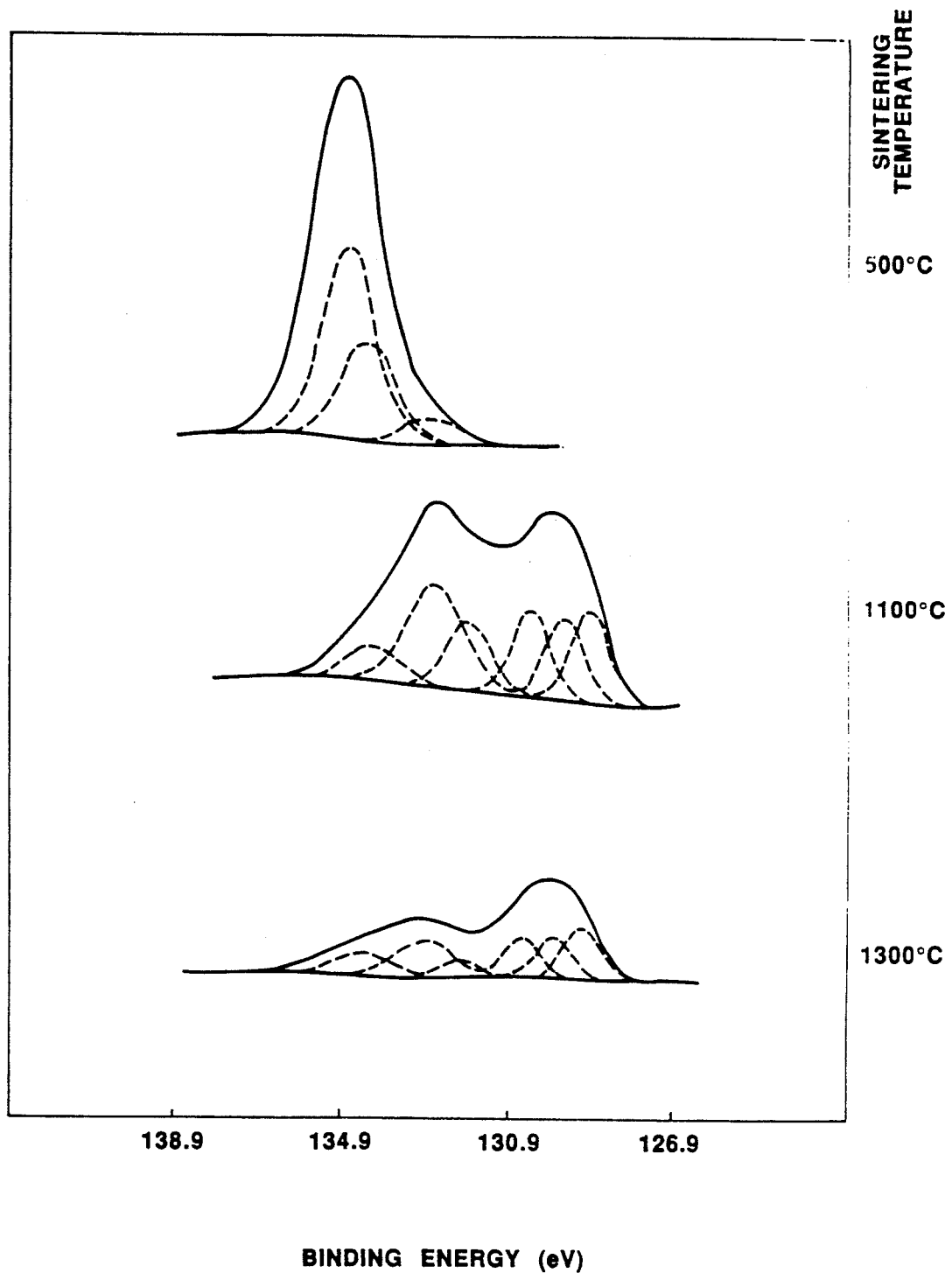
FIG. 29 is a graph showing the difference in the XPS spectrum by the sintering temperature after addition of phosphorus pentaoxide in acenaphthylene in acenaphthylene.

FIGS. 28 and 29 show the NMR spectrum for changes in the sintering process and the XPS spectrum.

Table 6 collectively shows the compositions of the various compounds.

TABLE 6

| compounds present | Sample sintering temperature (°C.) | | |
|---|---|---|---|
| | 500 | 1100 | 1300 |
| P$_2$O$_5$ | — | — | — |
| (C$_6$H$_5$O)$_2$P(=O)(OH) | 83.8% | 7.2% | 9.2% |
| (C$_6$H$_5$)$_2$P(=O)(OH) | 13.3% | 25.1% | 23.6% |
| (C$_6$H$_5$)$_3$P=O | 0.6% | 12.3% | 4.3% |
| (C$_6$H$_5$)$_3$P | 0.8% | 18.7% | 33.9% |
| P (element) | 1.1% | 14.1% | 4.3% |
| electron-rich P | 0.5% | 22.6% | 24.7% |

It is seen from the NMR spectrum that the main peak of phosphorus pentaoxide exists at 0 ppm for 500° C., while sidebands may be noticed at ±50 ppm and considerable amounts of P are left. As shoulders of the main peak, peaks may be noticed at about −10 ppm and about 20 ppm. Another peak may be noticed at about −30 ppm.

For 1100° C., a main peak may be noticed at about −10 ppm and bumps looking like sidebands may also be noticed, while other peaks are not noticed.

Finally, for 1300° C., the position and shape of the main peak are not changed from those for 1100° C. However, the strength is decreased, so that possibly the residual amount of phosphorus is also decreased. Closet to the peak at about −10 ppm is −8.9 ppm for. (C$_6$H$_5$)$_3$P or −12.7 ppm for (C$_6$H$_5$O)$_2$P(=O)(OH). However, clear distinction could not be made because of the broad peak shape.

As for the XPS spectrum, P$_2$O$_5$ was most abundant at 500° C. while (C$_6$H$_5$O)$_2$P(=O)(OH) was also abundant. However, (C$_6$H$_5$)$_3$P was not noticed. Although (C$_6$H$_5$)$_3$P was noticed at 1100° C., (C$_6$H$_5$O)$_2$P(=O)(OH) and (C$_6$H$_5$)$_3$P=O were present as intermediate products in the course of generation of (C$_6$H$_5$)$_3$P, indicating that a process of gradual reduction was involved.

The results of XPS indicated that, since (C$_6$H$_5$)$_3$P was not noticed at 500° C., the peak in NMR at about −10 ppm was that of (C$_6$H$_5$O)$_2$P(=O)(OH).

From the fact that, in the industrial manufacture of phosphorus, carbon is reacted at 1100° to 1400° C. with oxygen of phosphoric acid to remove oxygen in the form of a carbon monoxide gas, phosphorus present at a site closer to the surface tends to be reduced more readily. Thus it has been found that the composition is not changed despite changes in the sintering temperature from the results of NMR as the bulk information, while it has been found by XPS that phosphorus undergoes reduction at a region closest to the surface.

It may be proved from the above results that the above-mentioned anode material is mainly a compound the inner composition of which has a C—O—P linkage, while the surface composition is a particular compound having a reduced carbon-phosphorus linkage in addition to the carbon-oxygen-phosphorus (C—O—P) linkage.

Scrutinies by Petroleum Coke

A similar experiment was conducted using petroleum coke in place of acenaphthylene. That is, petroleum coke is pulverized to a mesh size of 200 mesh or less, and 1 g of P$_2$O$_5$ was added to 10 g of the petroleum coke powders. The resulting mixture was heat-treated under the same conditions as those of Example A and sintered for one hour to produce a powdered sample (Example F). The P content, capacity and the capacity loss were measured of the produced sample.

A powered sample (Comparative Example B) was prepared by heat treatment in the same manner as in Example F except not adding P₂O₅ to the petroleum coke. The P content, capacity and the capacity loss were measured of the produced sample.

Figure 30:
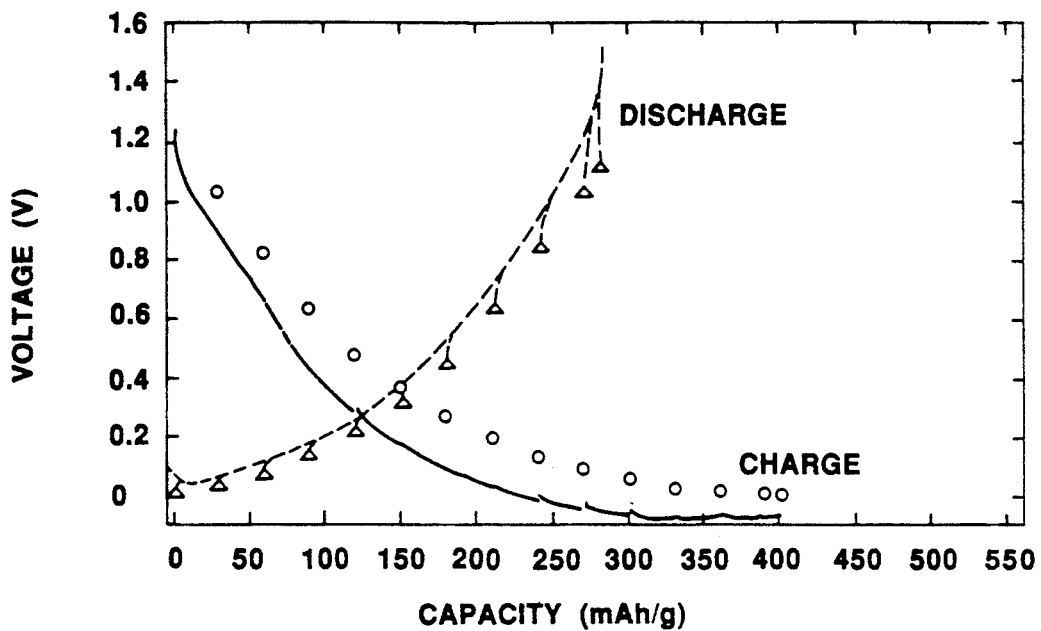
FIG. 30 is a graph showing charge and discharge curves of Example F and FIG. 31 is a graph showing charge and discharge curves of Comparative Example B.
Figure 31:
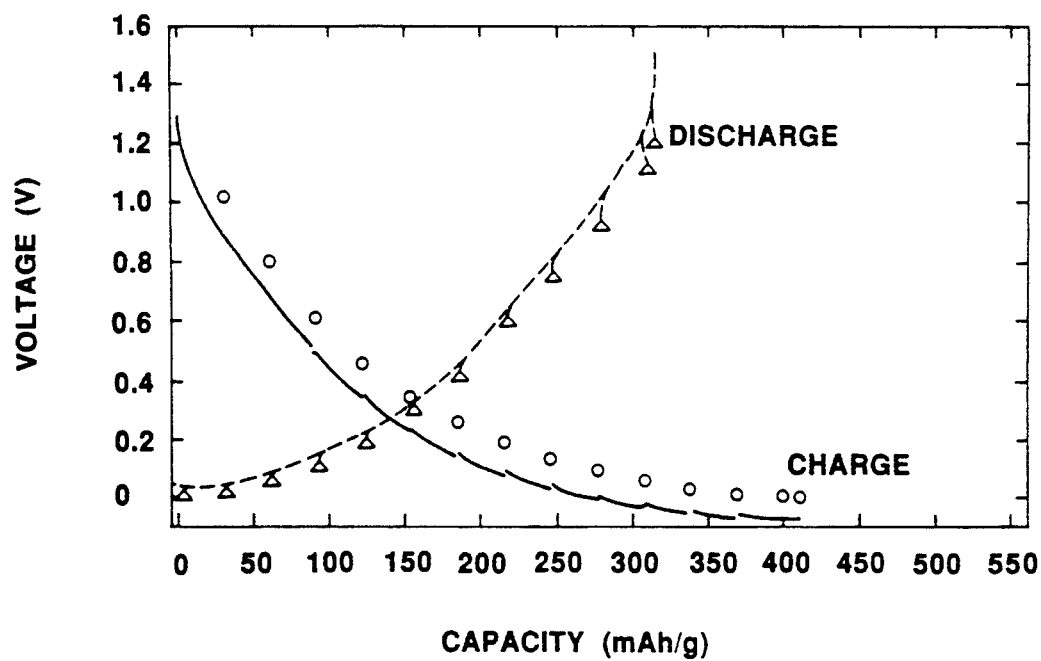

The results are collectively shown in Table 7. The charge and discharge curves during capacity measurement in Example F and Comparative Example B are shown in FIGS. 30 and 31, respectively. In the drawing, solid lines indicate closed-circuit voltage in the current-on state, while circle and triangle marks indicate the equilibrium potential after the end of the test.

TABLE 7

| | P content(wt %) | capacity(mAh/g) | capacity loss(mAh/g) |
|---|---|---|---|
| comp.Ex.B | — | 286 | 125 |
| Ex.F | 1.0 | 319 | 100 |

Using powdered samples of Example and Comparative Example B, a cell similar to that of the Example D and Example A was prepared and put to a cyclic test.

The charging/discharging cyclic test was carried out under the conditions that charging was made at 320 mAh per gram of the active material for the anode and discharging was made to a cut-off of 2.5 V.

Figure 32:
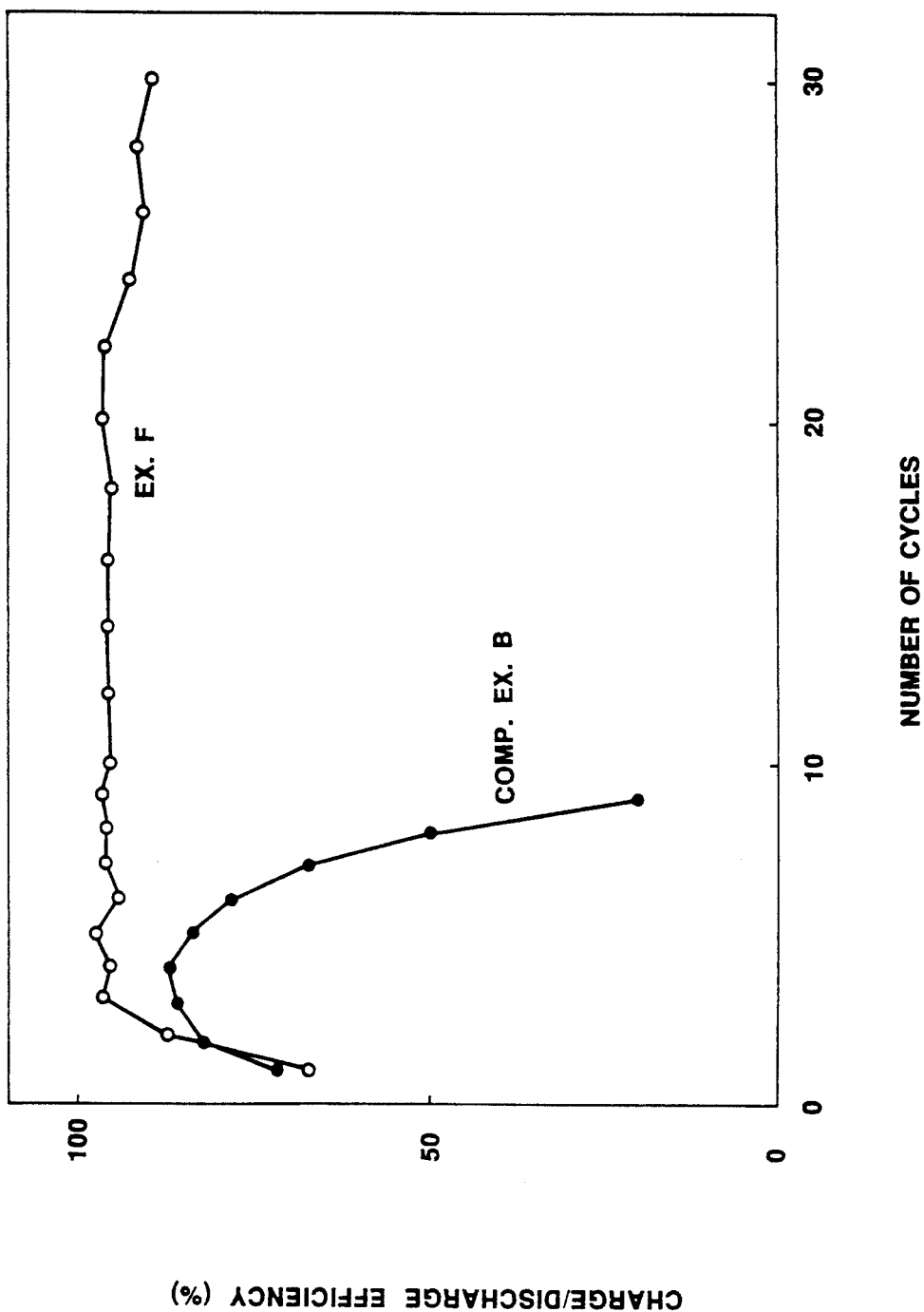
FIG. 32 is a graph showing cyclic characteristics of cells employing Example F and comparative Example B.

The results are shown in FIG. 32, from which it is seen that the P-containing sample exhibit superior cyclic characteristics.

The following are the results of analyses of the state of presence of P in the sample of Example F by $^{31}$P solid high resolution NMR and XPS measurement.

| Chemical Shift of Peak in $^{31}$P Solid NMR spectrum : —11 ppm | |
|---|---|
| Surface composition of P by XPS (ratios): | |
| $(C_6H_5O)_2(P=O)(OH)$ | 12.9% |
| $(C_6H_5)_2(P=O)(OH)$ | 15.5% |
| $(C_6H_5)_3P=O$ | 23.0% |
| $(C_6H_5)_3P$ | 22.3% |
| P | 7.5% |
| P having an electron-rich bond | 18.7% |

Although the present invention has been described with reference to concrete embodiments, these embodiments are merely illustrative and the preset invention may be modified in many ways without departing from the scope of the invention.

We claim:

1. An anode material comprising as its primary portion a coke compound obtained by adding phosphorous pentaoxide to a material selected from the group consisting of a carbonic material or an organic material heat-treated at a temperature not higher than 700° C., wherein said coke compound consists essentially of carbon, phosphorus and oxygen, said coke compound containing phosphorous in an amount of 0.2 to 9.0 wt % and exhibiting a peak of a $^{31}$P solid NMR spectrum in a range of ±100 ppm based on orthophosphoric acid, said coke compound exhibiting a peak in a 2p orbital spectrum of phosphorous atom of not more than 135 eV in X-ray photoelectron spectroscopy for a carbon-carbon linkage energy in the 1s orbital spectrum of a carbon atom of 284.6 eV.

2. A method for producing an anode material mainly composed of a coke compound consisting essentially of carbon, phosphorous and oxygen, said method comprising the steps of:

adding a phosphorous compound, in an amount of 0.2 to 32 wt % in terms of phosphorus, to a material selected from the group consisting of an organic material or a carbonic material treated to a temperature of 700° C. or less and sintered to a coke to produce a mixture, and sintering the mixture in an inert atmosphere.

3. The method of claim 2 wherein the phosphorus compound is selected from group consisting of: phosphorus pentaoxide or orthophosphoric acid.

4. A non-aqueous liquid electrolyte cell comprising:

an anode material mainly composed of coke compound consisting essentially of carbon, phosphorous and oxygen, said coke compound containing phosphorous in an amount of 0.2 to 9.0 wt % and exhibiting a peak in a $^{31}$P solid NMR spectrum in a range of ±100 ppm based on orthophosphoric acid, said coke compound exhibiting a peak in a 2p orbital spectrum of a phosphorous atom of not more than 135 eV in X-ray photoelectron spectroscopy for a carbon-carbon linkage energy in the 1s orbital spectrum of a carbon atom of 284.6 eV, a cathode containing Li, and a non-aqueous liquid electrolyte.

* * * * *